United States Patent
Hung

(10) Patent No.: US 9,350,452 B2
(45) Date of Patent: May 24, 2016

(54) SYSTEM AND METHOD FOR DISTRIBUTING OPTICAL SIGNALS

(71) Applicant: Optilab, LLC, Phoenix, AZ (US)

(72) Inventor: Henry H. Hung, Phoenix, AZ (US)

(73) Assignee: OPTILAB, LLC, Phoenix, AZ (US)

( * ) Notice: Subject to any disclaimer, the term of this patent is extended or adjusted under 35 U.S.C. 154(b) by 575 days.

(21) Appl. No.: 13/657,019

(22) Filed: Oct. 22, 2012

(65) Prior Publication Data

US 2014/0064304 A1    Mar. 6, 2014

Related U.S. Application Data

(60) Provisional application No. 61/694,110, filed on Aug. 28, 2012.

(51) Int. Cl.
| | | |
|---|---|---|
| H04B 10/27 | (2013.01) | |
| H04B 10/272 | (2013.01) | |
| H04J 14/02 | (2006.01) | |

(52) U.S. Cl.
CPC .............. *H04B 10/27* (2013.01); *H04B 10/272* (2013.01); *H04J 14/0221* (2013.01); *H04J 14/0226* (2013.01); *H04J 14/0282* (2013.01); *H04J 14/0298* (2013.01)

(58) Field of Classification Search
CPC .. G02B 6/3546; G02B 6/3548; G02B 6/3552; G02B 6/356; G01D 5/353; H04L 12/2838; H04L 9/0852; H04Q 11/0005; H04Q 11/0003; H04Q 11/0062; H04Q 11/0001; H04Q 11/0067; H04Q 2011/0069; H04Q 2011/0016; H04J 14/00; H04J 14/0206; H04J 14/0212; H04J 14/0293
See application file for complete search history.

(56) References Cited

U.S. PATENT DOCUMENTS

| | | | | | |
|---|---|---|---|---|---|
| 5,815,308 | A * | 9/1998 | Kim | ..................... | H01S 3/10023 359/334 |
| 5,995,259 | A * | 11/1999 | Meli | ................... | H01S 3/06754 398/92 |
| 6,449,069 | B1 * | 9/2002 | Fujita | .................. | H04J 14/0226 398/43 |
| 6,587,239 | B1 * | 7/2003 | Hung | ............................. | 398/79 |
| 6,810,215 | B1 * | 10/2004 | Oikawa | .................. | H04B 10/27 398/175 |
| 8,406,629 | B2 * | 3/2013 | Esser et al. | ....................... | 398/74 |
| 2002/0196491 | A1 * | 12/2002 | Deng et al. | .................... | 359/124 |
| 2004/0012843 | A1 * | 1/2004 | Aozasa et al. | ............. | 359/337.1 |
| 2004/0184806 | A1 * | 9/2004 | Lee et al. | ......................... | 398/79 |
| 2010/0254708 | A1 * | 10/2010 | Pradzynski | ....... | H04B 10/25754 398/98 |

* cited by examiner

*Primary Examiner* — Benjamin H. Elliott, IV
*Assistant Examiner* — Eric Nowlin
(74) *Attorney, Agent, or Firm* — Loza & Loza, LLP; George L. Fountain

(57) ABSTRACT

An optical signal distribution system is provided herein useful for multiple service operators (MSOs) in providing content data to subscribers, and receiving control and other data from subscribers. The system facilitates the transmission of content data to the subscribers and the control and other data from subscribers substantially in the optical domain. The system includes a head-end configured to transmit the content data via a forward channel optical signal and receive the control data via a composite reverse channel optical signal. The system also includes a signal distribution hub configured to receive and replicate the forward channel optical signal for transmission to optical taps, receive reverse channel optical signals from the optical taps, generate a composite reverse channel optical signal, and transmit the composite reverse channel optical signal. Each optical tap sends and receives the forward and reverse channel optical signals to and from a plurality of subscribers units.

17 Claims, 16 Drawing Sheets

SYSTEM AND METHOD FOR DISTRIBUTING OPTICAL SIGNALS

CROSS REFERENCE TO A RELATED APPLICATION

The application claims the benefit of the filing date of Provisional Application Ser. No. 61/694,110, filed on Aug. 28, 2012, and entitled, "System and Method for Distributing Optical Signals," which is incorporated herein by reference.

FIELD

The present disclosure relates generally to optical systems, units and components, and in particular, to a system and method for distributing optical signals.

BACKGROUND

Multiple system operators (MSOs), such as cable companies, typically provide content data to many subscribers. For example, MSOs typically provide video/audio, in the form of movies or television content, to subscribers via a digital communication network. Similarly, MSOs also provide audio only, such as piped music, to subscribers via such digital communication network. Other content data provided by MSOs to subscribers include internet data (e.g., HTML documents, email, and other internet data), emergency and alert information originating from local or national government agencies, and other types of data.

As mentioned above, MSOs typically use a digital communication network to provide content data to subscribers via a forward channel, and also receive control and other data from subscribers via a reverse channel. For example, the control and other data sent from subscribers to MSOs typically include orders for particular content, such as a movie, internet data, such as a request (e.g., URL) for a particular HTML document, or an email destined for a particular recipient. In the past, MSOs have employed hybrid fiber-coaxial (HFC) type digital communication network to facilitate the communication of data between MSOs and subscribers.

A typical HFC digital communication network consists of a head-end, one or more hubs coupled to the head end, and a plurality of taps coupled to each of the one or more hubs. The head-end provides the source of the content data for subscribers, and also receives and processes the control and other data from subscribers. The head-end is communicatively coupled to each hub by way of an optical fiber network, where data is communicated between the head-end and the hubs in the optical domain. Each hub serves as a node for routing content data to subscribers within a defined geographical area, and routing control and other data from such subscribers to the head-end. Each hub is coupled to a plurality of taps by way of an electrical network, where data is communicated between the hub and the taps in the electrical domain, such as by radio frequency (RF) signals. Each subscriber unit within the geographical area is coupled to one of the plurality of taps via an electrical connection.

An HFC digital communication network has several drawbacks. First, the electrical communication network between the hubs and the subscribers has limited bandwidth. Thus, as a result, the number of subscribers that can be serviced by a single hub is relatively limited. Additionally, the limited bandwidth further limits the amount of content channels available for subscribers in the forward direction, as well as the upload capability for subscribers in the reverse direction. Moreover, the power required to operate the electrical communication network is relatively large, and thus, expensive to operate for MSOs.

SUMMARY

An aspect of the disclosure relates to an optical signal distribution system that may be useful to MSOs in providing content data to subscribers and receiving control and other data from subscribers. The optical signal distribution system is configured to deliver the content data to subscribers and receive the control and other data from subscribers substantially by way of optical signals or in the optical domain.

This overcomes many of the drawbacks of HFC digital communication systems or networks. For instance, the optical signal distribution system is capable of higher bandwidth due to the communications being substantially in the optical domain. This enables MSOs to service greater number of subscribers. It also allows MSOs to offer more channels for subscribers, thereby providing more options and a better entertainment experience for subscribers. Additionally, the signally being in the optical domain enables MSOs to operate their systems with substantially less power, thereby potentially reducing costs and increasing revenues for MSOs. The reduction in power consumption also provides the environmental benefits.

More specifically, the optical signal distribution system comprises a head-end, a signal distribution hub, a plurality of optical taps, and a plurality of subscriber units. The head-end comprises a source of the content data for subscribers and a sink (e.g., a data processing unit) for the control and other data from the subscribers. The content data may include movies, television programs, audio, alert and emergency information, internet data, and other types of content data. The control and other data may include requests or orders for movies, subscription changes, requests for internet data (e.g., URL), emails, etc. The head-end comprises an optical transmitter for generating and transmitting a forward channel optical signal including the content data to the signal distribution hub for subsequent delivery to subscribers. The head-end further comprises an optical receiver for receiving a composite reverse channel optical signal from the signal distribution hub, and extracting the subscriber control and other data from the signal.

The optical signal distribution system further comprises one or more optical communication mediums, such as one or more optical fibers which may also include one or more optical ring resonators, coupling the head-end to the signal distribution hub. In one embodiment, one or more optical communication mediums may be configured to facilitate transmission of the forward channel optical signal, and another one or more optical communication mediums may be configured to facilitate transmission of the composite reverse channel optical signal. In another embodiment, the same one or more optical communication mediums may serve to facilitate the transmission of both the forward channel optical signal and the composite reverse channel optical signal. In the latter case, the head-end may further comprise a wavelength-division multiplexer (WDM) to transmit and receive the forward and reverse channel signals to and from the same optical communication medium.

The signal distribution hub is configured to receive the forward channel optical signal from the head-end, amplify and split the forward signal to generate a plurality of forward channel optical signals, and transmit the plurality of forward channel optical signals to the optical taps by way of a plurality of optical communication mediums, respectively. Additionally, the signal distribution hub is further configured to receive a plurality of reverse channel optical signals from the optical taps by way of the plurality of optical signals, respectively. The signal distribution hub is further configured generate one or more composite reverse channel optical signals based on the plurality of reverse channel optical signals. The signal distribution hub is configured to transmit the one or more composite reverse channel optical signals to the head-end.

With respect to components, the signal distribution hub comprises an optical amplifier, such as an erbium doped fiber amplifier (EDFA), configured to amplify the forward channel optical signal. The signal distribution hub further comprises an optical distribution assembly comprising a splitter configured to split the amplified forward channel optical signal into a plurality of forward channel optical signals. Additionally, the optical distribution assembly comprises a plurality of wavelength-division multiplexers (WDMs) configured to multiplex the plurality of forward channel optical signals onto respective optical communication mediums for transmission to the respective optical taps, and de-multiplex the reverse channel optical signals from the respective optical communication mediums. The signal distribution hub further comprises a return transmitter module adapted to generate the one or more composite reverse channel optical signals for transmission to the head-end.

In one embodiment, the return transmitter module comprises a plurality of optical receivers configured to generate electrical signals from the reverse channel optical signals, respectively. The return transmitter module further comprises a combiner configured to combine the electrical signals to generate a composite electrical signal. Additionally, the return transmitter module comprises an optical transmitter configured to generate a composite reverse channel optical signal, based on the composite electrical signal, for transmission to the head-end.

In another embodiment, the return transmitter module comprises a plurality of optical receivers configured to generate electrical signals from the reverse channel optical signals, respectively. The return transmitter module further comprises a first combiner configured to combine a first subset of the electrical signals to generate a first composite electrical signal. The return transmitter module further comprises a second combiner configured to combine a second subset of the electrical signals to generate a second composite electrical signal. Additionally, the return transmitter module comprises first and second optical transmitters configured to generate first and second composite reverse channel optical signals, based on respectively the first and second composite electrical signals, for transmission to the head-end. The return transmitter module may further comprise a wavelength-division multiplexer (WDM) configured to multiplex the first and second composite reverse channel optical signals onto the same optical communication medium for transmission to the head-end.

Each optical tap may be coupled to a plurality of subscriber units by way of a plurality of optical communication mediums, respectively. As an example, the signal distribution hub may be coupled to eight optical taps, and each optical tap may be coupled to 32 subscriber units. Thus, in this example, the signal distribution hub may service up to 256 subscribers. Additionally, the signal distribution hub may be configured with a plurality of optical distribution assemblies for servicing much higher number of subscribers. Accordingly, such signal distribution hub may be easily expandable for servicing more subscribers in response to growing customers in a defined geographical area.

Other aspects, advantages and novel features of the present invention will become apparent from the following detailed description of the invention when considered in conjunction with the accompanying drawings.

DETAILED DESCRIPTION OF THE EXEMPLARY EMBODIMENTS

Figure 1:
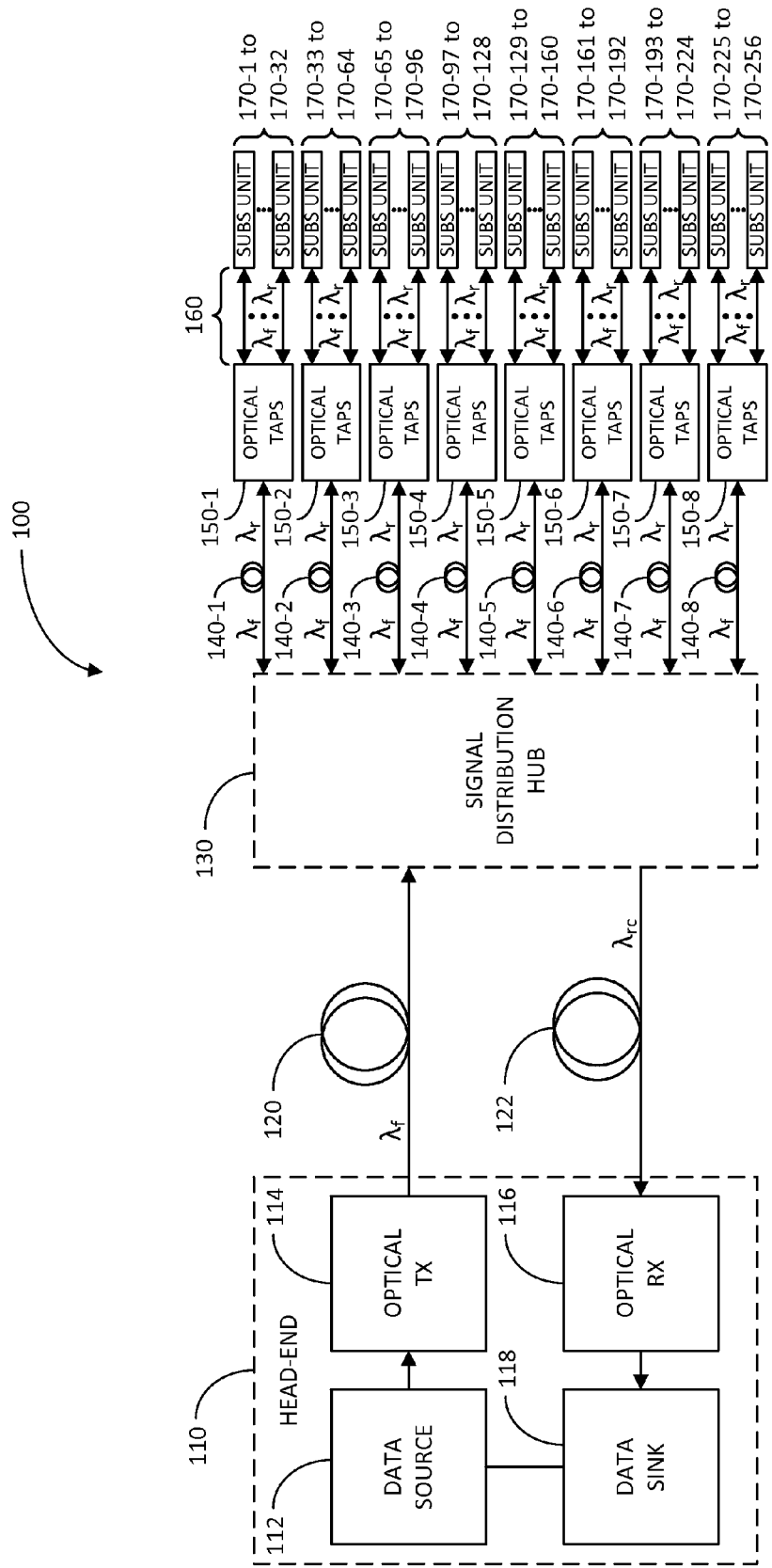
FIG. 1 illustrates a block diagram of an exemplary optical signal distribution system for distributing optical signals in accordance with an aspect of the disclosure.

FIG. 1 illustrates a block diagram of an exemplary optical signal distribution system 100 for distributing optical signals in accordance with an aspect of the disclosure. An objective of the exemplary optical signal distribution system 100 is to communicate data between a head-end or source of content data and a plurality of subscribers substantially in the optical domain. Providing signaling between the head-end and subscribers substantially in the optical domain has many advantages over prior HFC communication systems.

First, the optical signal distribution system 100 is capable of bandwidths substantially higher that can be achieved by HFC systems. This allows for a single hub to service more subscribers, which translates to more revenue for MSOs. Further, the higher bandwidth allows for substantially more channels to be provided to subscribers, thereby providing subscribers with more entertainment options. Additionally, the higher bandwidth provides subscribers improved speed for downloading and uploading internet data. Second, the optical signal distribution system 100 is capable of substantial reduction in the amount of power consumed in operating the system. This translates to increase revenue for MSOs, as well as having beneficial consequences for the environment.

In particular, the optical signal distribution system 100 comprises a head-end 110, a signal distribution hub 130, a plurality of optical taps 150-1 to 150-8, and a plurality of subscriber units 170-1 to 170-256. The optical signal distribution system 100 further comprises an optical communication medium 120 (e.g., one or more optical fibers) for routing optical signals $\lambda_f$ in a forward direction (towards the subscribers) from the head-end 110 to the signal distribution hub 130. The optical communication medium 120 may include one or more optical ring resonators. Additionally, the optical signal distribution system 100 comprises another optical communication medium 122 (e.g., one or more optical fibers) for routing optical signals $\lambda_{rc}$ in a reverse direction (towards the head-end) from the signal distribution hub 130 to the head-end 110. Similarly, the optical communication medium 122 may include one or more optical ring resonators.

The optical signal distribution system 100 further comprises a plurality of optical communication mediums 140-1 to 140-8 for routing optical signals $\lambda_f$ and $\lambda_r$ in the forward and reverse directions between the signal distribution hub 130 and the optical taps 150-1 to 150-8, respectively. As shown, each of the optical communication mediums 140-1 to 140-8 may include an optical ring resonator. Although, in this example, there are eight (8) optical taps 150-1 to 150-8, it shall be understood that the optical signal distribution system 100 may include any number of optical taps coupled to the signal distribution hub 130. And, the number of optical communication mediums coupling the signal distribution hub to the optical taps may vary accordingly.

The optical signal distribution system 100 further a plurality of sets of optical communication mediums (e.g., one or more optical fibers) coupling the optical taps 150-1 to 150-8 to sets of subscriber units 170-1 to 170-32, 170-33 to 170-64, 170-65 to 170-96, 170-97 to 170-128, 170-129 to 170-160, 170-161 to 170-192, 170-193 to 170-224, and 170-225 to 170-256, respectively. Although, in this example, there are 32 subscriber units assigned or coupled to each optical tap, it shall be understood that the optical signal distribution system 100 may include any number of subscriber units assigned or coupled to a single optical tap. And, the number of optical communication mediums coupling each optical tap to the corresponding subscriber units may vary accordingly.

In this example, the head-end 110 comprises a data source 112, an optical transmitter (Tx) 114, an optical receiver (Rx) 116, and a data sink 118. The data source 112 includes content data for transmission to the subscribers. The data source 112 may, in turn, receive content data from external sources, such as by a satellite link, a wide area network (WAN), such as the Internet, and from other external sources. The data source 112 provides the content data to the optical transmitter 114 to generate an optical signal $\lambda_f$ which includes the content data. Pursuant to many data transmission techniques, the content data may undergo any one or more of the following: error encoding, channel encoding, encrypting, interlacing, constellation symbol modulation, RF modulation, other processing, and optical signal modulation to generate the forward channel optical signal $\lambda_f$ comprising the content data. It shall be understood that the optical signal $\lambda_f$ may comprise one or more distinct wavelengths.

The optical receiver 116 receives an optical signal $\lambda_{rc}$, which as discussed in more detail herein, may be a combination or composite of optical signals $\lambda_r$ generated at one or more respective subscriber units 170-1 to 170-256. Pursuant to many data reception techniques, the received signal $\lambda_{rc}$ may undergo one or more of the following: optical demodulation, RF demodulation, constellation symbol demodulation, de-interlacing, decrypting, channel decoding, error decoding, and other signal processing to generate the control and other data from the subscribers. The optical receiver 116 provides the control and other data to the data sink 118. The data sink 118 processes the control and other data. As previously discussed, the control data may specify an order from a subscriber for a particular content, such as a movie, or a request for internet data (HTML, email, etc.). In response, the data sink 118 instructs the data source 112 to provide the appropriate content to the subscribers based on the received control data. Additionally, the other data from subscriber may include emails, which the data sink 118 transmits via a wide area network (WAN), such as the Internet.

Figure 2A:
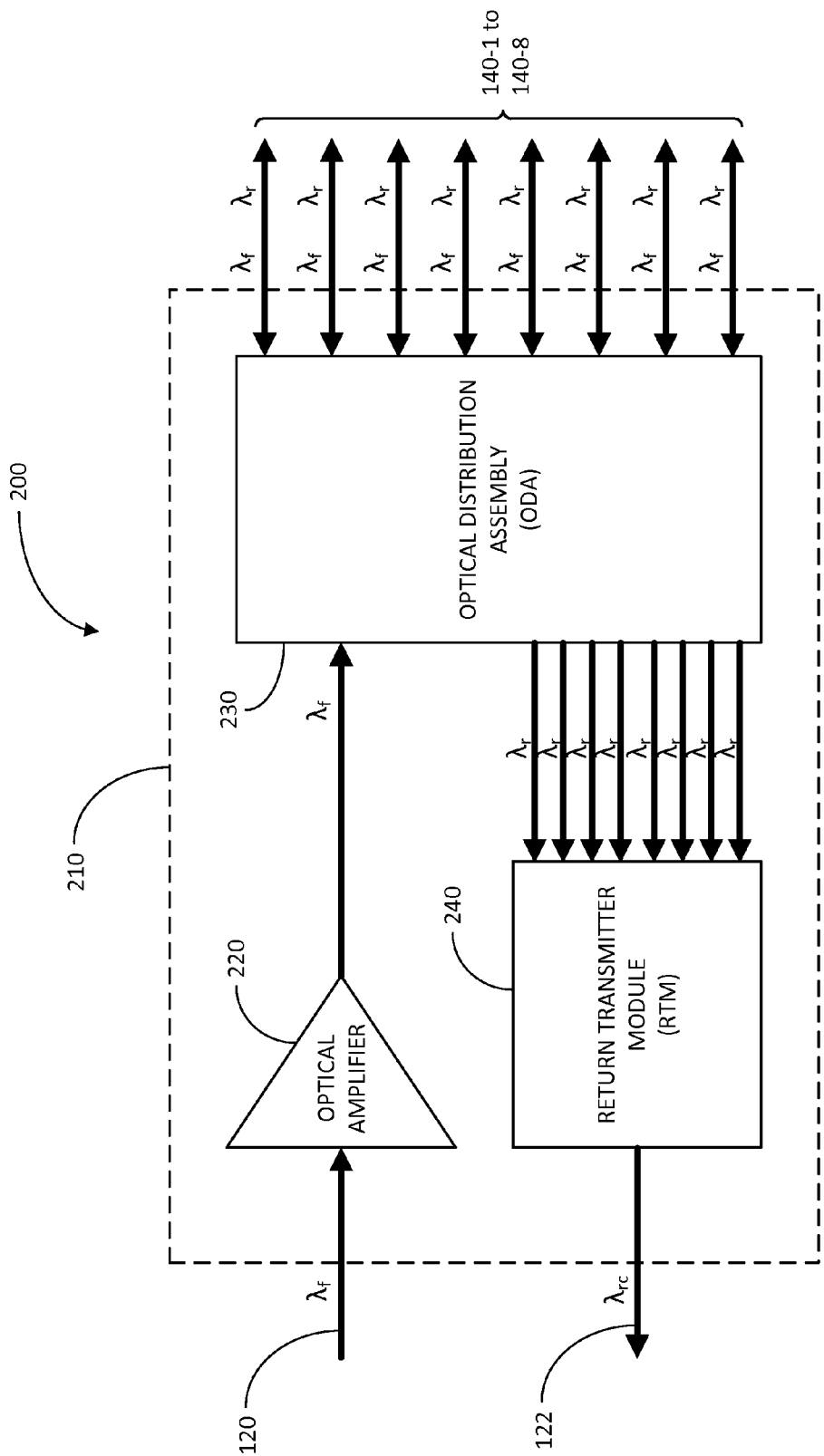
FIG. 2A illustrates a block diagram of an exemplary signal distribution hub in accordance with another aspect of the disclosure.

FIG. 2A illustrates a block diagram of an exemplary signal distribution hub 200 in accordance with another aspect of the disclosure. The signal distribution hub 200 may be a detailed implementation of the signal distribution hub 130, previously discussed. In summary, the signal distribution hub 200 receives the forward channel optical signal $\lambda_f$ from the head-end 110 via the optical communication medium 120, amplifies and splits the forward optical signal $\lambda_f$ to generate eight (8) forward channel optical signals $\lambda_f$, and transmits the eight (8) forward channel optical signals $\lambda_f$ to the optical taps 150-1 to 150-8 by way of the optical communication mediums 140-1 to 140-8, respectively. The signal distribution hub 200 also receives the reverse channel optical signals $\lambda_r$ from the subscriber units by way of the optical communication mediums 140-1 to 140-8, combines the reverse channel optical signals $\lambda_r$ to form one or more composite reverse channel optical signals $\lambda_{rc}$, and transmits the one or more composite reverse channel optical signals $\lambda_{rc}$ to the head-end 110 by way of the optical communication medium 122.

In more detail, the signal distribution hub 200 comprises an optical amplifier 220, an optical distribution assembly (ODA) 230, and a return transmitter module (RTM) 240, all of which may be situated within a housing 210. The optical amplifier 220 receives the forward channel optical signal $\lambda_f$ from the head-end 110 by way of the optical communication medium 120, and amplifies the optical signal $\lambda_f$ in the optical domain. The amplified optical signal $\lambda_f$ is routed from the optical amplifier 220 to the ODA 230. The ODA 230 splits the forward channel optical signal $\lambda_f$ to form eight (8) replicas of the optical signal $\lambda_f$, and transmits the replicas $\lambda_f$ to the optical taps 150-1 to 150-8 by way of optical communication mediums 140-1 to 140-8, respectively.

The ODA 230 also receives the reverse channel optical signals $\lambda_r$ from the optical taps 150-1 to 150-8 by way of the optical communication mediums 140-1 to 140-8, respectively. The ODA 230 directs the reverse channel optical signals $\lambda_r$ to the RTM 240. The RTM 240, in turn, combines the reverse channel optical signals $\lambda_r$ to form the composite reverse channel optical signal $\lambda_{rc}$. The RTM 240 then transmits the composite reverse channel optical signal $\lambda_{rc}$ to the head-end 110 by way of optical communication medium 122.

Figure 2B:
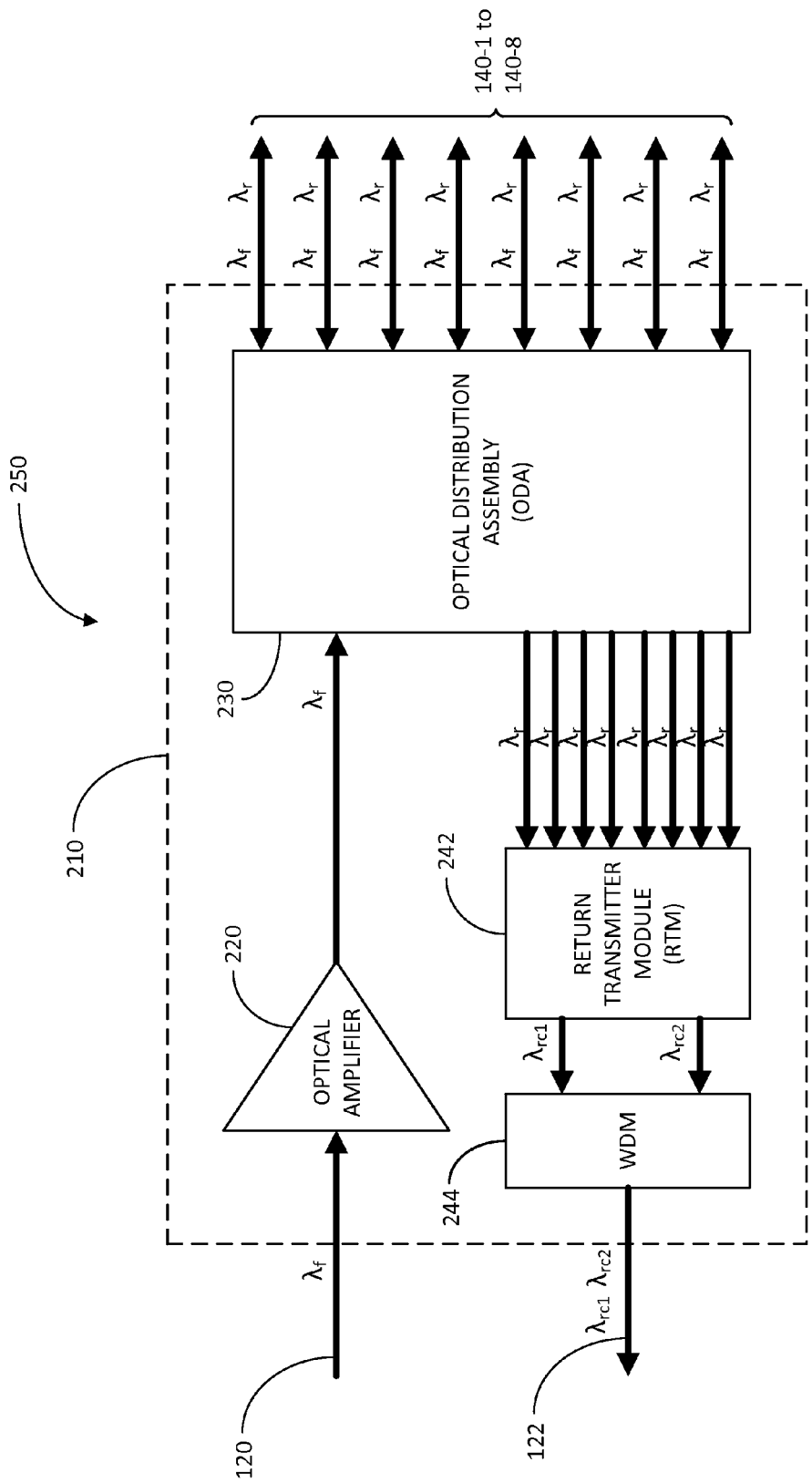
FIG. 2B illustrates a block diagram of another exemplary signal distribution hub in accordance with another aspect of the disclosure.

FIG. 2B illustrates a block diagram of another exemplary signal distribution hub 250 in accordance with another aspect of the disclosure. The signal distribution hub 250 is similar to signal distribution hub 200 previously discussed, and includes some of the same components as indicated by the same reference numbers. In contrast, the signal distribution hub 250 includes a modified RTM 242 and a wavelength-division multiplexer (WDM) 244.

In this example, the RTM 242 generates a pair of composite reverse channel optical signals $\lambda_{rc1}$ and $\lambda_{rc2}$, wherein composite optical signal $\lambda_{rc1}$ is based on a first distinct set of the reverse channel optical signals $\lambda_r$ and composite optical signal $\lambda_{rc2}$ is based on a second distinct set of the reverse channel optical signals $\lambda_r$. It shall be understood that the RTM 242 may generate any number of composite optical signals from any sets of the reverse channel optical signals. The WDM 244 multiplexes the composite reverse channel optical signals $\lambda_{rc1}$ and $\lambda_{rc2}$ onto the optical communication medium 122 for transmission to the head-end 110.

Figure 3:
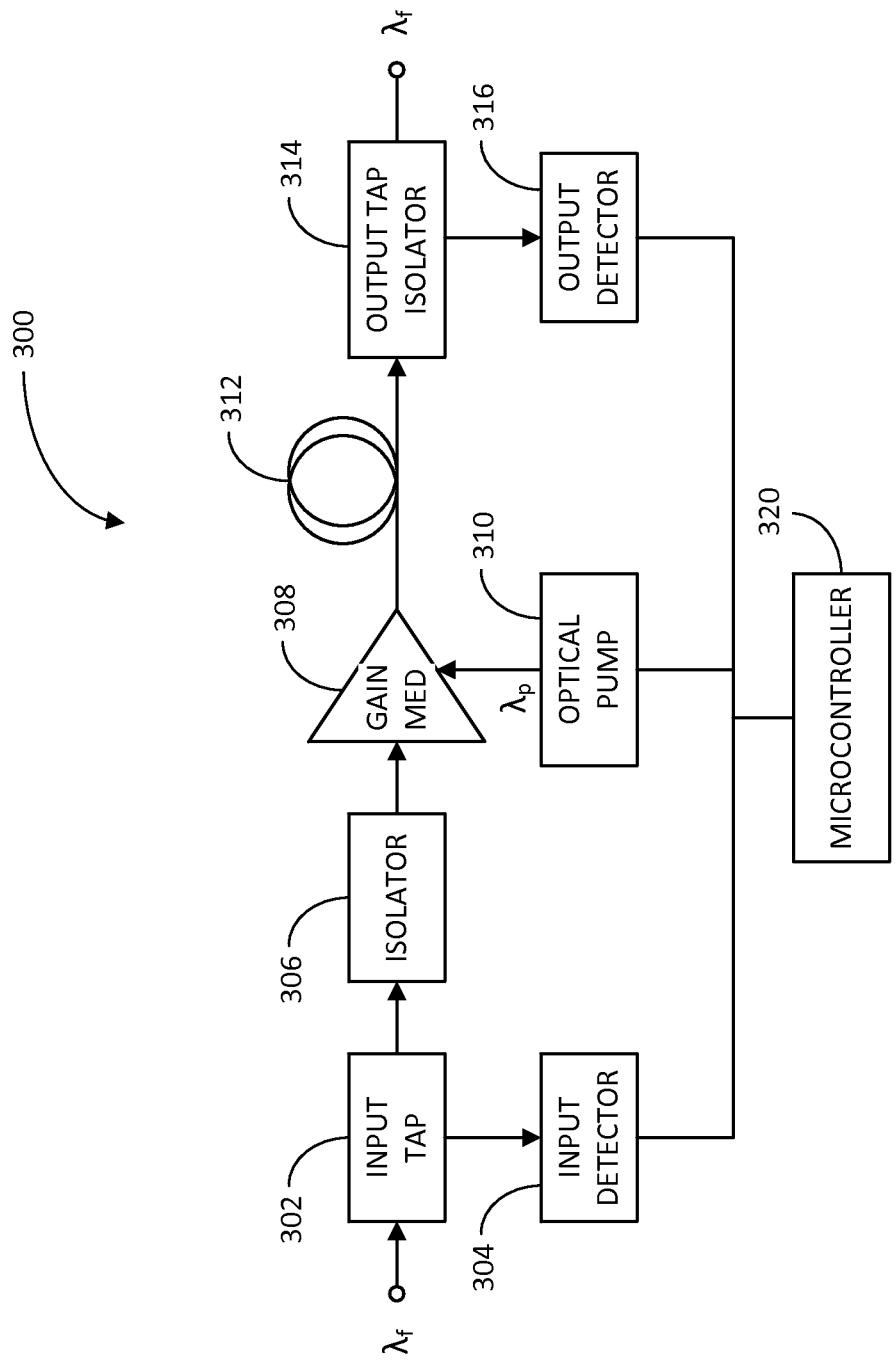
FIG. 3 illustrates a block diagram of an exemplary optical amplifier in accordance with another aspect of the disclosure.

FIG. 3 illustrates a block diagram of an exemplary optical amplifier 300 in accordance with another aspect of the disclosure. The optical amplifier 300 may be an exemplary detailed implementation of the optical amplifier 220 previously discussed. As indicated, the optical amplifier 220 amplifies the forward channel optical signal $\lambda_f$ in the optical domain. The optical amplifier 300 comprises an input tap 302, an input detector 304, an isolator 306, a gain medium 308, an optical pump 310, an optical ring resonator 312, an output tap/isolator 314, an output detector 316, and a microcontroller 320.

The input tap 302 receives the forward channel optical signal $\lambda_f$ from the head-end 110 by way of the optical communication medium 120, couples off a relatively small portion of the optical signal for the input detector 304, and forwards the remainder to the isolator 306. The input detector 304 generates an electrical signal based on the input optical signal, and may digitize the electrical signal for processing by the microcontroller 320. The optical signal $\lambda_f$ forwarded by the input tap 302 is applied to the gain medium 308 by way of the isolator 306. The gain medium 308 combines the optical signal $\lambda_f$ with a pump optical signal $\lambda_p$ generated by the optical pump 310 to amplify the optical signal $\lambda_f$. As an example, the gain medium 308 may comprise an erbium-doped fiber. Other types of gain mediums may be used.

The amplified forward channel optical signal $\lambda_f$ is then pass through the optical ring resonator 312, which operates to remove or filter remnants of the optical pump signal and other unwanted optical components from the amplified optical signal. The output tap isolator 314 couples off a relatively small portion of the amplified and filtered optical signal $\lambda_f$ for the output detector 316, and outputs the remainder portion of the amplified and filtered optical signal $\lambda_f$. The output detector 316 generates an electrical signal based on the output optical signal, and may digitize the electrical signal for processing by the microcontroller 320. The microcontroller 320 controls the optical pump 310, and in particular, the power level of the optical pump signal $\lambda_p$ based on the electrical signals from the input and output detectors 304 and 316 in order to achieve a defined gain for the forward channel optical signal $\lambda_f$.

Figure 4:
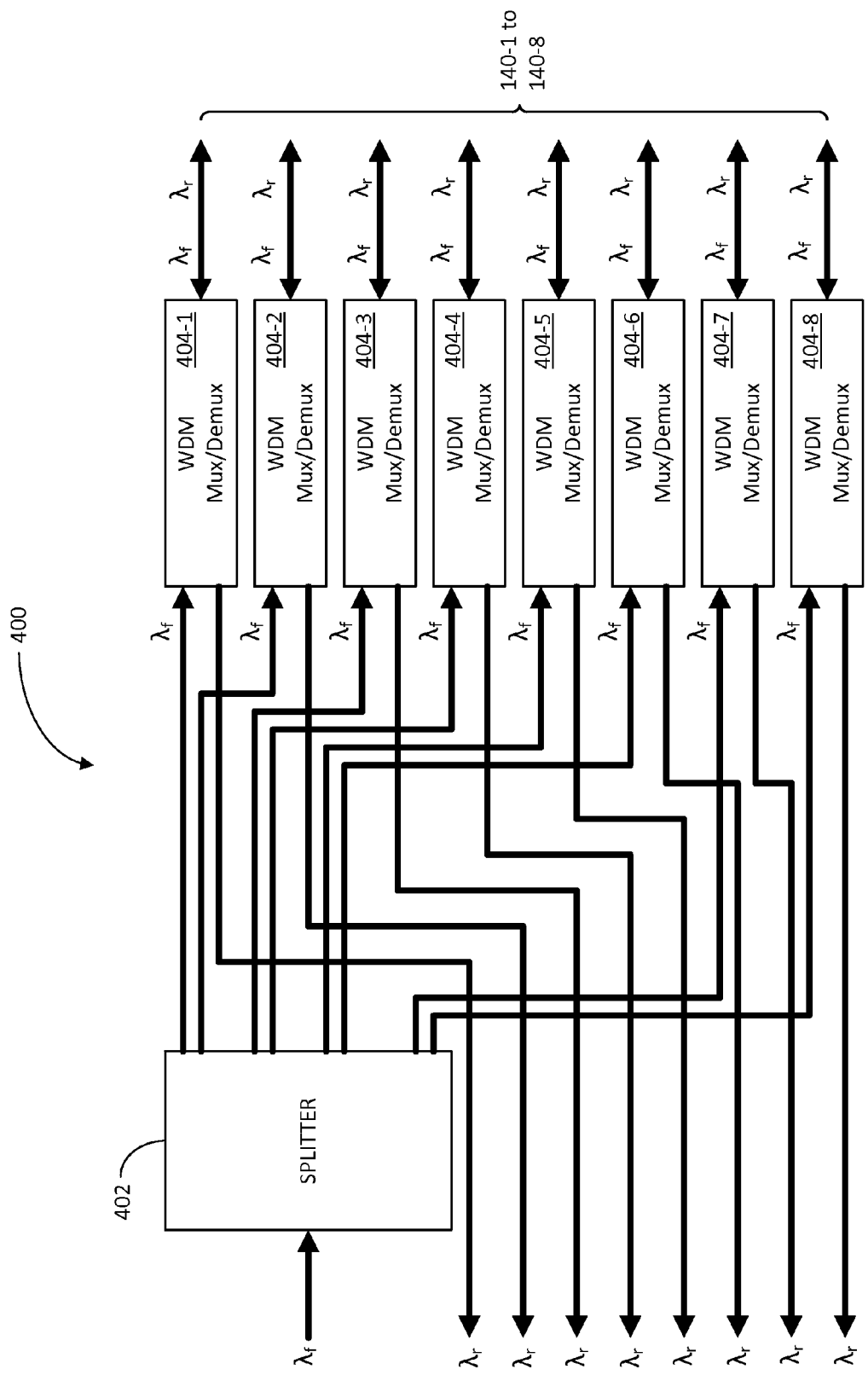
FIG. 4 illustrates a block diagram of an exemplary optical distribution assembly (ODA) in accordance with another aspect of the disclosure.

FIG. 4 illustrates a block diagram of an exemplary optical distribution assembly (ODA) 400 in accordance with another aspect of the disclosure. The ODA 400 may be an exemplary detailed implementation of the ODA 230 previously discussed. As previously discussed, the ODA 400 receives the amplified forward channel optical signal $\lambda_f$, splits the optical signal $\lambda_f$ to generate a plurality (e.g., eight (8)) replica optical signals $\lambda_f$, and transmits the replica optical signals $\lambda_f$ by way of optical communication mediums 140-1 to 140-8, respectively. Additionally, the ODA 400 receives the reverse channel optical signals $\lambda_r$ by way of the optical communication mediums 140-1 to 140-8, respectively, and provides the signals $\lambda_r$ to the RTM.

More specifically, the ODA 400 comprises a splitter 402, and a plurality (e.g., eight (8)) wavelength-division multiplexers (WDMs) 404-1 to 404-8. The splitter 402 receives the amplified forward channel optical signal $\lambda_f$, and splits the signal to form eight (8) replica optical signals $\lambda_f$. The eight (8) WDM 404-1 to 404-8 receive and multiplexe the eight (8) replica optical signals $\lambda_f$ onto the optical communication mediums 140-1 to 140-8, respectively. The eight (8) WDM 404-1 to 404-8 also de-multiplexes the eight (8) reverse channel optical signals $\lambda_r$ from the optical communication mediums 140-1 to 140-8, respectively. Thus, the optical communication mediums 140-1 to 140-8 are used for simultaneous transmission of the forward and reverse channel optical signals $\lambda_f$ and $\lambda_r$, both having distinct wavelengths. As previously discussed, the de-multiplexed reverse channel optical signals $\lambda_r$ are provided to the RTM for combining and forming one or more composite reverse channel optical signals $\lambda_{rc}$.

Figure 5A:
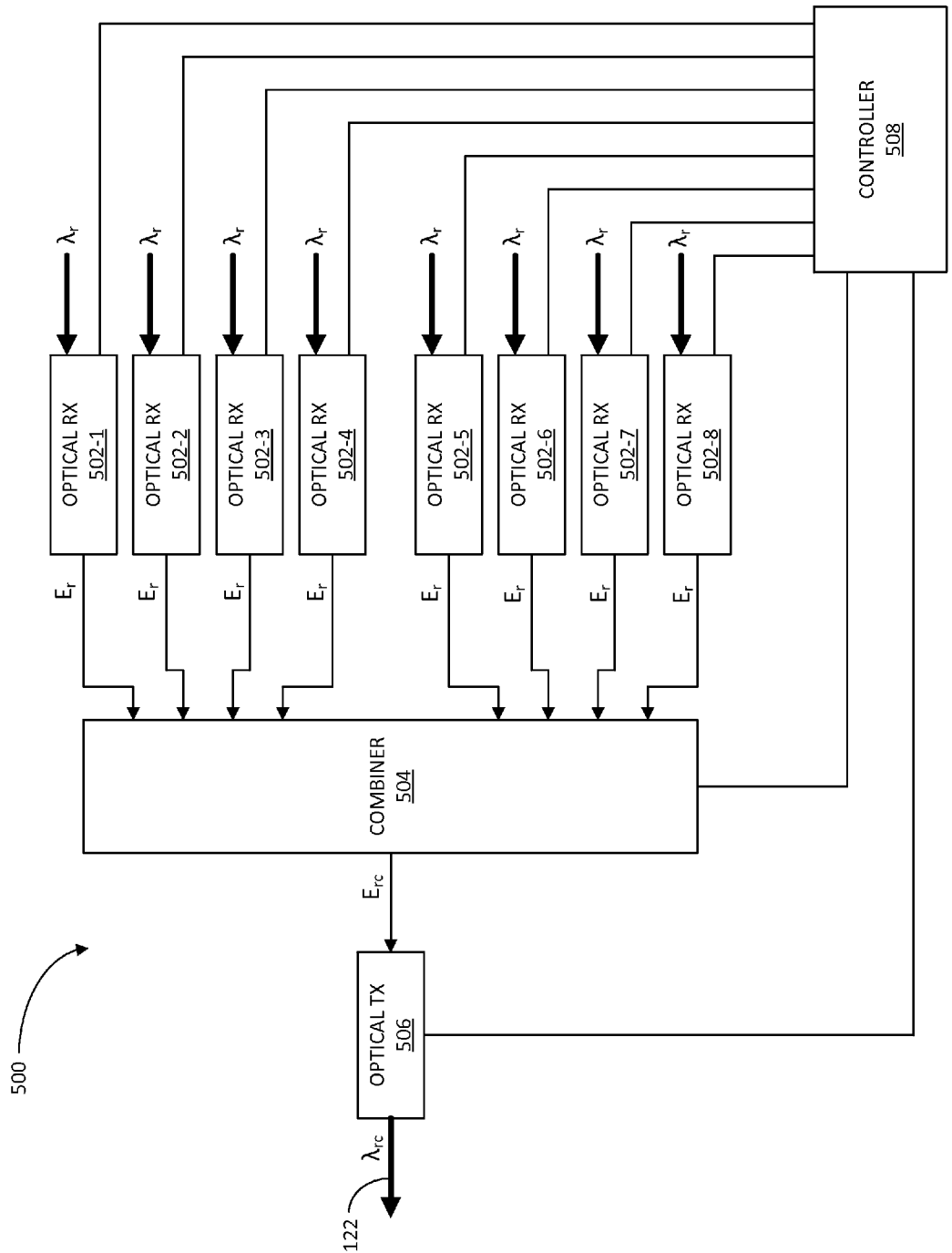
FIG. 5A illustrates a block diagram of an exemplary return transmitter module (RTM) in accordance with another aspect of the disclosure.

FIG. 5A illustrates a block diagram of an exemplary return transmitter module (RTM) 500 in accordance with another aspect of the disclosure. The RTM 500 may be an exemplary detailed implementation of the RTM 240 previously discussed. In summary, the RTM 240 forms a composite optical signal $\lambda_{rc}$ from the reverse channel optical signals $\lambda_r$ provided by the ODA. The RTM 240 may accomplish this by converting the reverse channel optical signals $\lambda_r$ into corresponding electrical signals $E_r$, combining the electrical signals $E_r$ to form a composite electrical signal $E_{rc}$, and modulates an optical carrier with the composite electrical signal $E_{rc}$ to form the composite reverse channel optical signal $\lambda_{rc}$.

More specifically, the RTM 500 comprises a plurality of optical receivers 502-1 to 502-8, a combiner 504, an optical transmitter 506, and a controller 508. The optical receivers 502-1 to 502-8 receive the reverse channel optical signals $\lambda_r$ from the ODA, and generate corresponding electrical signals $E_r$ by demodulating the reverse channel optical signals $\lambda_r$, respectively. The electrical signals $E_r$ may be RF signals in distinct frequency bands. The combiner 504 combines the electrical signals $E_r$ to form a composite electrical signal $E_{rc}$. For example, the combiner 504 may simply add the electrical signals $E_r$, or time-multiplex the signals $E_r$, or frequency-multiplex the signals $E_r$, or code-division multiplex the signals $E_r$, or perform other types of techniques to combine the signals $E_r$ to generate the composite electrical signal $E_{rc}$.

The optical transmitter 506 then modulates the composite electrical signal $E_{rc}$ onto an optical carrier to form the composite reverse channel optical signal $\lambda_{rc}$. The output of the optical transmitter 506 may be coupled to the optical communication medium 122 for transmission of the composite reverse channel optical signal to the head-end 110. The controller 508 monitors the status of the various components in order to generate an indication as to the operational status of the RTM 500. For example, the controller 508 may provide operational status indications, such as no input signal (e.g., by activating a red LED (not shown)), input signal power level low (e.g., below a threshold power level) (e.g., by activating a yellow LED (not shown)), and input signal power level within specification (e.g., by activating a green LED (not shown)).

Figure 5B:
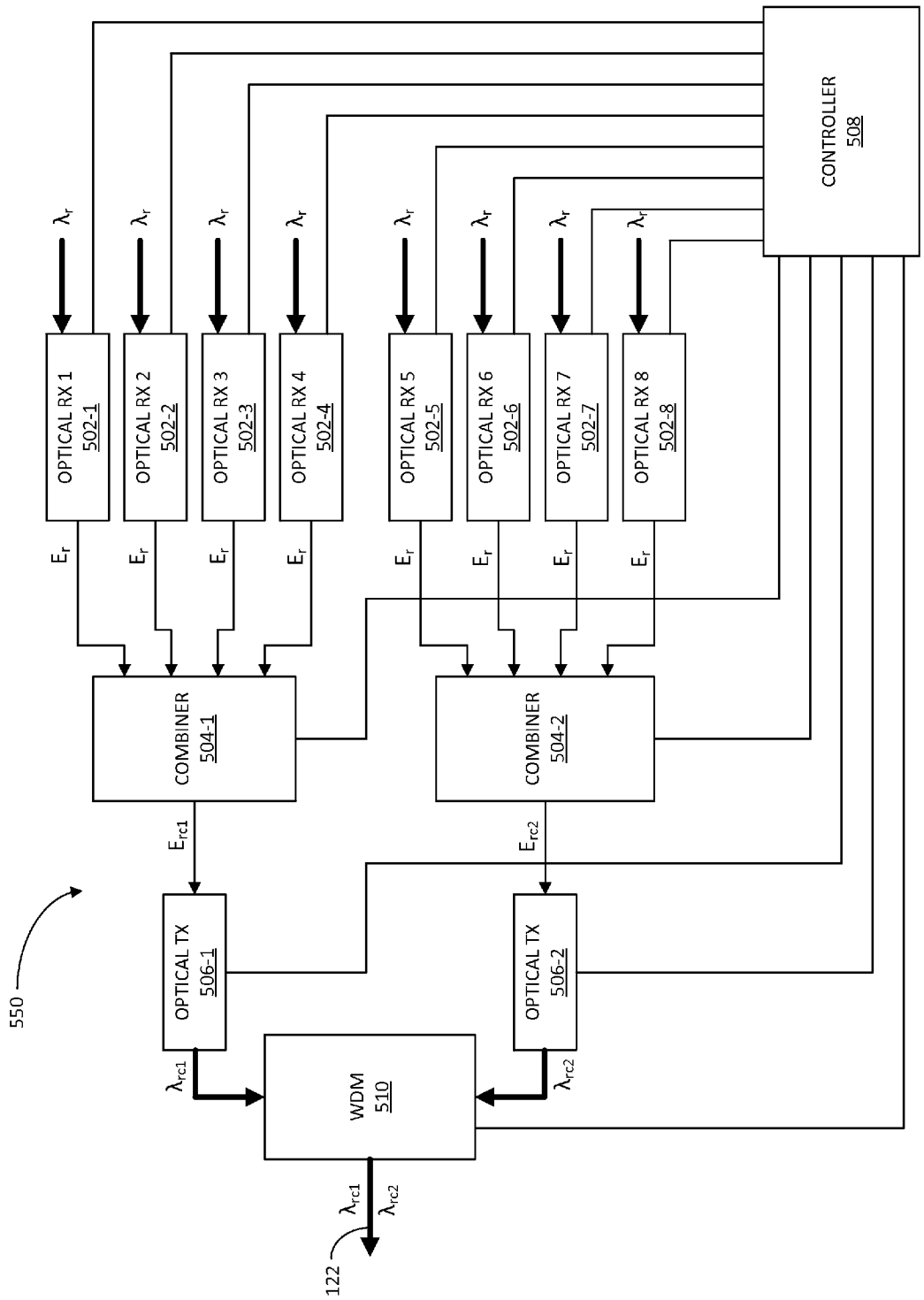
FIG. 5B illustrates a block diagram of another exemplary return transmitter module (RTM) in accordance with another aspect of the disclosure.

FIG. 5B illustrates a block diagram of another exemplary return transmitter module (RTM) 550 in accordance with another aspect of the disclosure. The RTM 550 is similar to RTM 500 previously discussed, and includes many of the same elements as indicated by the same reference numbers.

The RTM 550 differs from RTM 500 in that it generates a plurality of composite reverse channel optical signals based on distinct sets of the reverse channel optical signals $\lambda_r$. In this example, the RTM 500 generates a first composite optical signal $\lambda_{rc1}$ based on the reverse channel optical signals $\lambda_r$ applied to optical receivers 502-1 to 502-4, and a second composite optical signal $\lambda_{rc2}$ based on the reverse channel optical signals $\lambda_r$ applied to optical receivers 502-5 to 502-8.

More specifically, the RTM 550 comprises a plurality (e.g., eight (8)) optical receivers 502-1 to 502-8, a plurality (e.g., two (2)) of combiners 504-1 and 504-2, a plurality (e.g., two (2)) of optical transmitters 506-1 and 506-2, and a wavelength-division multiplexer (WDM) 510. The optical receivers 502-1 to 502-8 receive the reverse channel optical signals $\lambda_r$ from the ODA, and generate corresponding electrical signals $E_r$ by demodulating the reverse channel optical signals $\lambda_r$, respectively. A first set of the electrical signals $E_r$ generated by the optical receivers 502-1 to 502-4 are applied to respective inputs of combiner 504-1. Similarly, a second set of the electrical signals $E_r$ generated by the optical receivers 502-5 to 502-8 are applied to respective inputs of combiner 504-2.

The combiners 504-1 and 502 combine the first and second sets of electrical signals $E_r$ in accordance with any of the various techniques previously discussed to generate first and second composite electrical signals $E_{rc1}$ and $E_{rc2}$, respectively. The optical transmitters 506-1 and 506-2 modulate the first and second composite electrical signals $E_{rc1}$ and $E_{rc2}$ onto respective optical carriers of distinct wavelengths to generate the first and second composite reverse channel optical signals $\lambda_{rc1}$ and $\lambda_{rc2}$, respectively. The WDM 510 multiplexes the first and second reverse channel optical signals $\lambda_{rc1}$ and $\lambda_{rc2}$ onto the optical communication medium 122 for transmission to the head-end 110. As in the previous embodiment, the controller 508 monitors the components of the RTM 550 and provides an indication as to their respective operational status.

Figure 6:
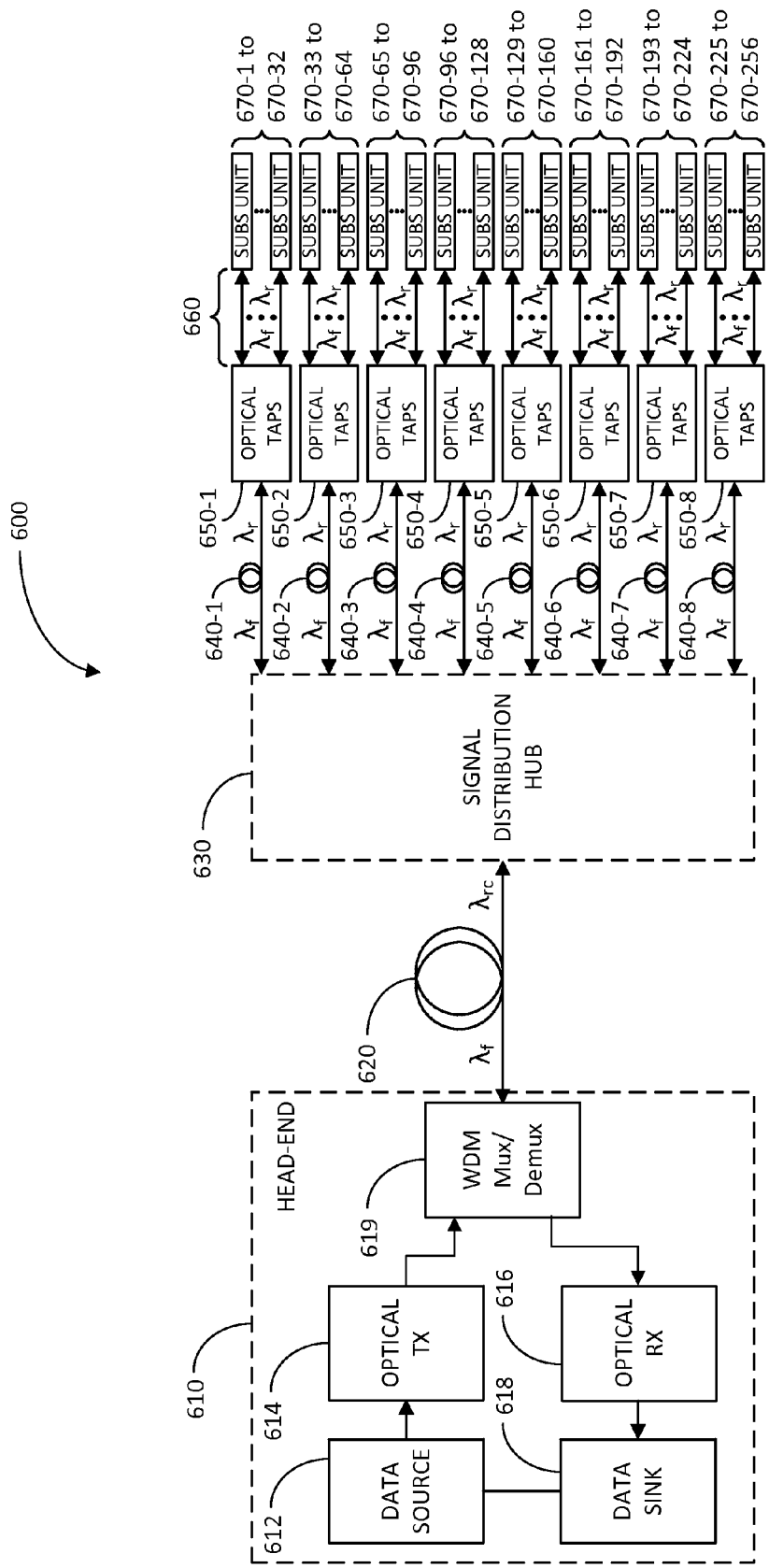
FIG. 6 illustrates a block diagram of another exemplary optical signal distribution system for distributing optical signals in accordance with an aspect of the disclosure.

FIG. 6 illustrates a block diagram of another exemplary optical signal distribution system 600 for distributing optical signals in accordance with an aspect of the disclosure. The optical signal distribution system 600 is similar to the optical signal distribution system 100 previously discussed. However, the optical signal distribution system 600 includes an optical communication medium coupling the head-end to the signal distribution hub, wherein the communication medium facilitates the transmission of both forward channel optical signal $\lambda_f$ and the composite reverse channel optical signal $\lambda_{rc}$.

More specifically, the optical signal distribution system 600 comprises a head-end 610, a signal distribution hub 630, a plurality (e.g., eight (8)) optical taps 650-1 to 650-8, and a plurality of subscriber units 670-1 to 670-256. The optical signal distribution system 600 further comprises an optical communication medium 620 (e.g., one or more optical fibers) communicatively coupling the head-end 610 to the signal distribution hub 630. As shown, the optical communication medium 620 may include one or more optical ring resonators.

The optical signal distribution system 600 further comprises a plurality of optical communication mediums 640-1 to 640-8 (e.g., one or more optical fibers) communicatively coupling the signal distribution hub 630 to the optical taps 650-1 to 650-8, respectively. As shown, each of the optical communication mediums 640-1 to 640-8 may include one or more optical ring resonators. Additionally, the optical signal distribution signal 600 further comprises a plurality of sets of optical communication mediums 660 (e.g., one or more optical fibers) communicatively coupling the optical taps 650-1 to 650-8 to subscriber units 670-1 to 670-32, 670-33 to 670-64, 670-65 to 670-96, 670-97 to 670-128, 670-129 to 670-160, 670-161 to 670-192, 670-193 to 670-224, and 670-225 to 670-256, respectively.

The head-end 610 of optical signal distribution system 600, in turn, comprises a data source 612, an optical transmitter 614, a wavelength-division multiplexer (WDM) 619, an optical receiver 616, and a data sink 618. Similar to the previous embodiment 100, the data source 612 provides content data for subscribers. The optical transmitter 614 generates a forward channel optical signal $\lambda_f$ which carries or includes the content data. The optical receiver 616 receives the composite reverse channel optical signal $\lambda_{rc}$, and extracts therefrom the control and other data from the subscribers. And, the data sink 618 processes the control and other data as previously discussed.

In this case, the WDM 619 multiplexes the forward channel optical signal $\lambda_f$ received from the optical transmitter 614 onto the optical communication medium 620 for transmission to the signal distribution hub 630. The WDM 619 also de-multiplexes the composite reverse channel optical signal $\lambda_{rc}$ from the optical communication medium 620 and provides it to the optical receiver 616. Thus, the use of the WDM 619 allows for the simultaneous transmission of the forward channel optical signal $\lambda_f$ and the composite reverse channel optical signal $\lambda_{rc}$ by way of the optical communication medium 620, both signals $\lambda_f$ and $\lambda_{rc}$ having distinct wavelengths.

Figure 7A:
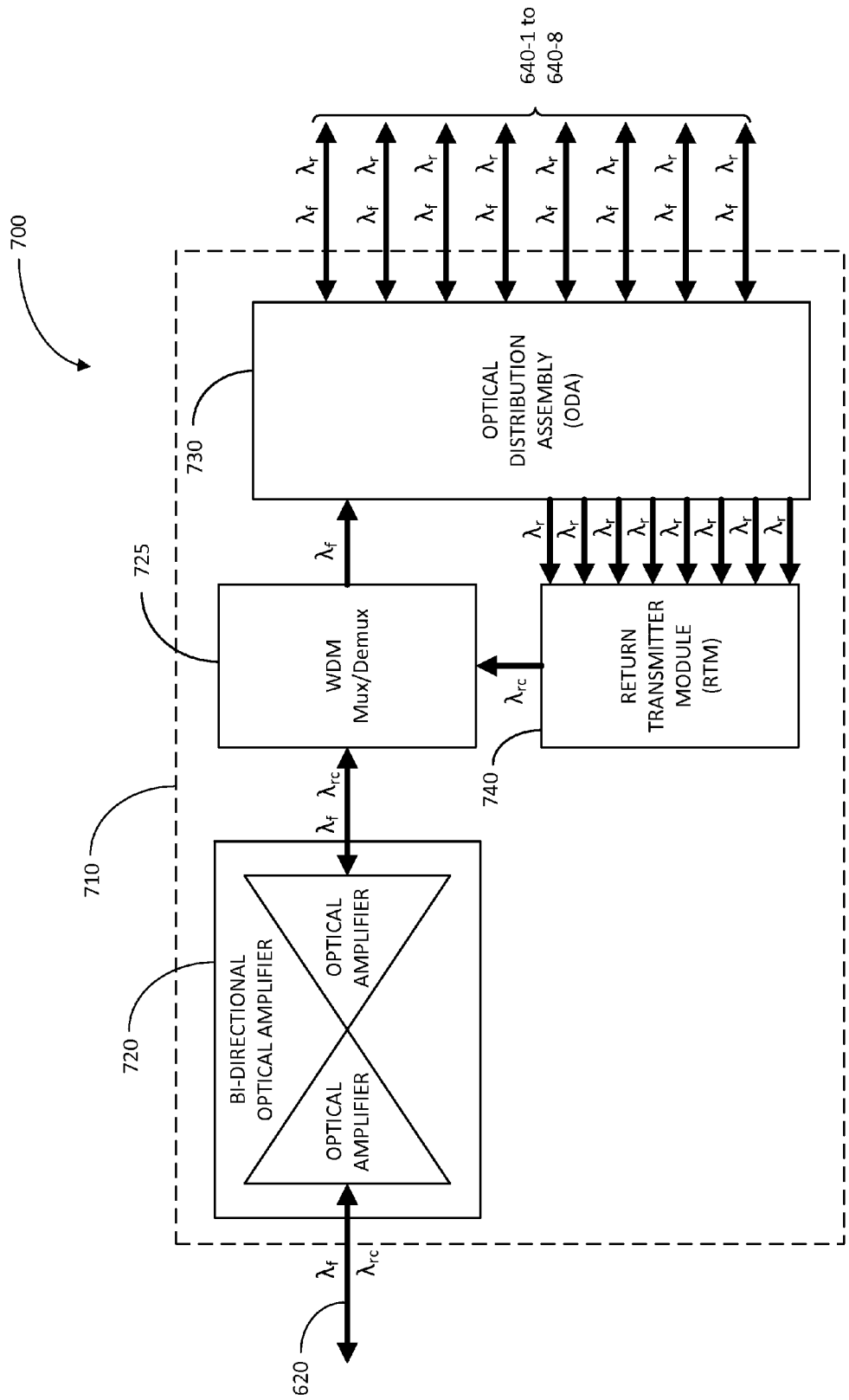
FIG. 7A illustrates a block diagram of yet another exemplary signal distribution hub in accordance with another aspect of the disclosure.

FIG. 7A illustrates a block diagram of yet another exemplary signal distribution hub 700 in accordance with another aspect of the disclosure. The signal distribution hub 700 may be an exemplary detailed implementation of the signal distribution hub 630 previously discussed. The signal distribution hub 700 comprises a bi-directional optical amplifier 720, a wavelength-division multiplexer (WDM) 725, an optical distribution assembly (ODA) 730, and a return transmitter module (RTM) 740, all of which may be situated within a housing 710.

The bi-directional optical amplifier 720 receives the forward channel optical signal $\lambda_f$ from the head-end 610 by way of the optical communication medium 620, and amplifies the optical signal $\lambda_f$. The WDM 725 de-multiplexes the amplified forward channel optical signal $\lambda_f$ from the forward output of the bi-directional optical amplifier 720, and provides the amplified signal $\lambda_f$ to the ODA 730. Similar to previously-discussed ODAs, the ODA 730 splits the amplified forward channel optical signal $\lambda_f$ into a plurality (e.g., eight (8)) replica signals $\lambda_f$, and multiplexes those signals $\lambda_f$ onto optical communication mediums 640-1 to 640-8 for transmission to the optical tabs 650-1 to 650-8, respectively.

Similar to the previous embodiments, the ODA 730 de-multiplexes the reverse channel optical signals $\lambda_r$ from the respective optical communication mediums 640-1 to 640-8, and provides the reverse channel optical signals $\lambda_r$ to the RTM 740. Similar to the previous embodiments, the RTM 740 generates a composite reverse channel optical signal $\lambda_{rc}$ based on the reverse channel optical signals $\lambda_r$. The WDM 725 multiplexes the composite reverse channel optical signal $\lambda_{rc}$ onto the reverse input of the bi-directional amplifier 720. The bi-directional amplifier 720 amplifies the composite reverse channel optical signal $\lambda_{rc}$, and provides the amplified optical signal $\lambda_{rc}$ to the optical communication medium 620 for transmission to the head-end 610.

Figure 7B:
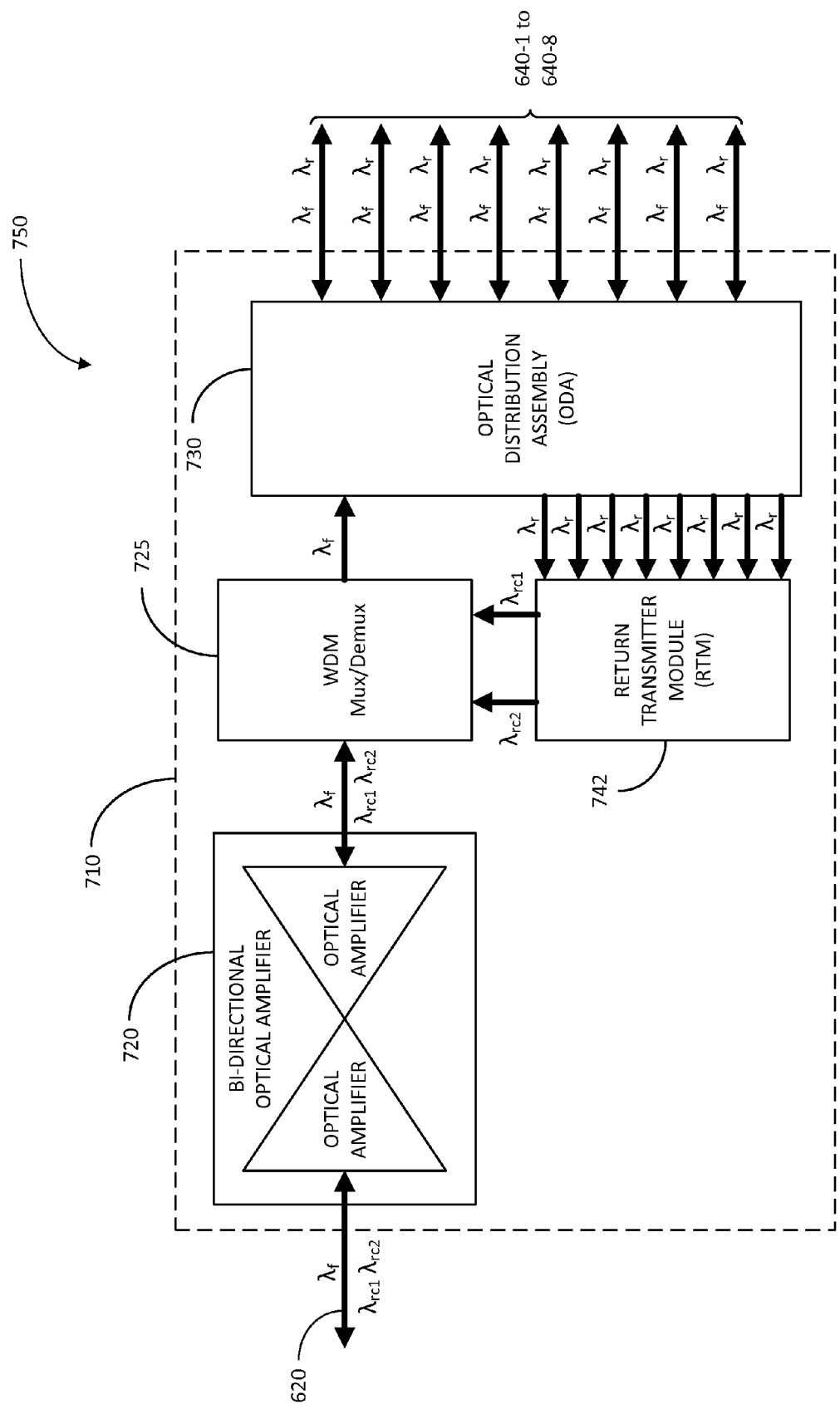
FIG. 7B illustrates a block diagram of still another exemplary signal distribution hub in accordance with another aspect of the disclosure.

FIG. 7B illustrates a block diagram of still another exemplary signal distribution hub 750 in accordance with another aspect of the disclosure. The signal distribution hub 750 is similar to signal distribution hub 700 previously discussed, and includes several of the same elements as indicated by the same reference numbers. The signal distribution hub 750 differs from hub 700 in that it includes an RTM 742 that generates a plurality (e.g., two (2)) composite reverse channel optical signals $\lambda_{rc1}$ and $\lambda_{rc2}$ based on distinct sets of the reverse channel optical signals $\lambda_r$. Accordingly, the WDM 725 multiplexes the composite reverse channel optical signals $\lambda_{rc1}$ and $\lambda_{rc2}$ onto the reverse input of the bi-directional amplifier 720, which amplifies the signals $\lambda_{rc1}$ and $\lambda_{rc2}$ and couples them to the optical communication medium 620 for transmission to the head-end 610.

Figure 8:
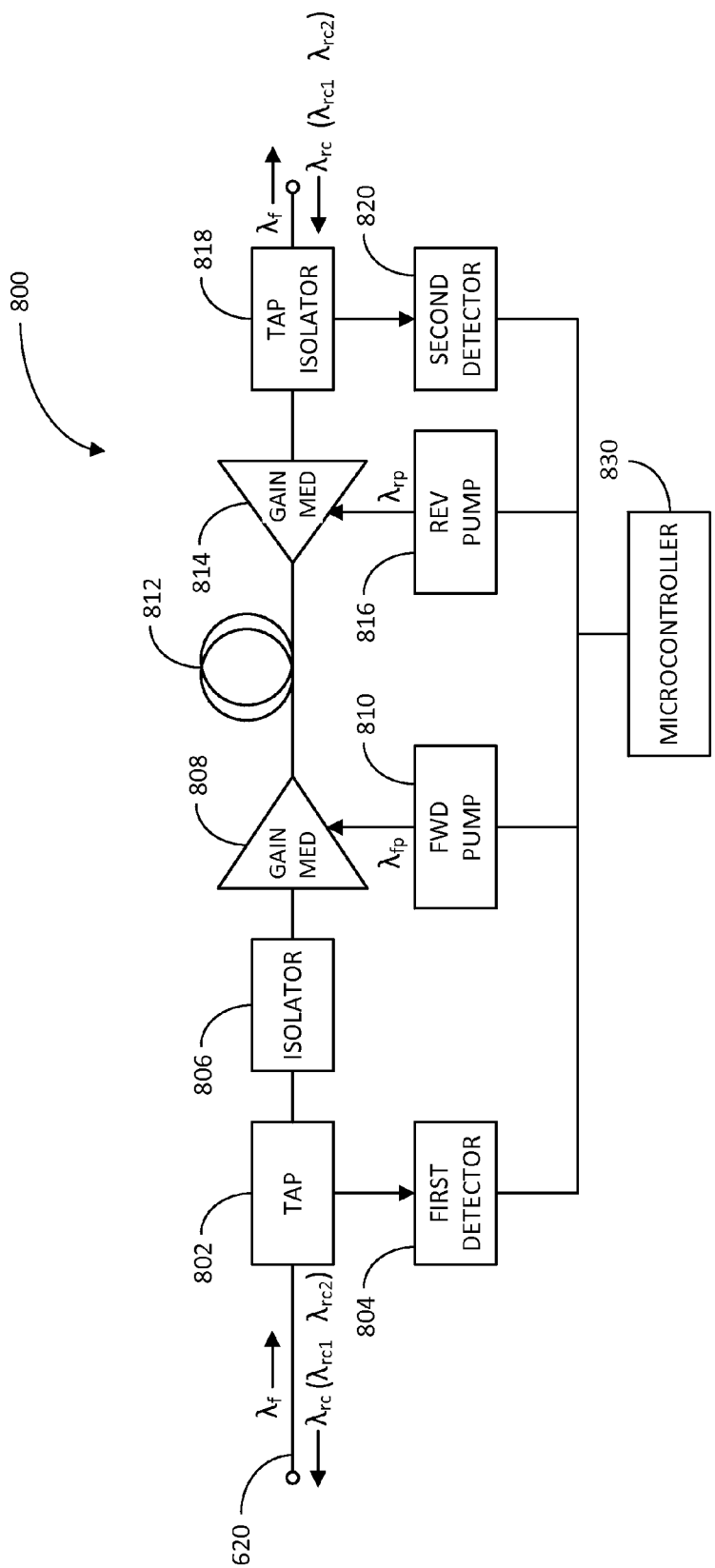
FIG. 8 illustrates a block diagram of an exemplary bi-directional optical amplifier in accordance with another aspect of the disclosure.

FIG. 8 illustrates a block diagram of an exemplary bi-directional optical amplifier 800 in accordance with another aspect of the disclosure. The bi-directional optical amplifier 800 may be an exemplary detailed implementation of the bi-directional optical amplifier 720 previously discussed. As indicated, the bi-directional optical amplifier 800 amplifies the forward channel optical signal $\lambda_f$ in the forward direction, and amplifies one or more composite reverse channel optical signals, such as signals $\lambda_{rc}$ or $\lambda_{rc1}$ and $\lambda_{rc2}$ in the reverse direction. The bi-directional optical amplifier 800 comprises a tap 802, a first detector 804, an isolator 806, a forward channel gain medium 808, a forward channel optical pump 810, an optical ring resonator 812, a reverse channel gain medium 814, a reverse channel optical pump 816, a tap isolator 818, a second detector 820, and a microcontroller 830.

With regard to amplification in the forward direction, the tap 802 receives the forward channel optical signal $\lambda_f$ from the head-end 610 by way of the optical communication medium 620, couples off a relatively small portion of the forward optical signal $\lambda_f$ for the first detector 804, and forwards the remainder to the isolator 806. The first detector 804 generates an electrical signal based on the forward optical signal $\lambda_f$, and may digitize the electrical signal for processing by the microcontroller 830. The forward optical signal $\lambda_f$ is applied to the gain medium 808 by way of the isolator 806. The gain medium 808 combines the forward optical signal $\lambda_f$ with a forward channel pump optical signal $\lambda_{fp}$ generated by the forward channel optical pump 810 to amplify the forward channel optical signal $\lambda_f$. As an example, the gain medium 908 may comprise an erbium-doped fiber. Other types of gain mediums may be used.

The amplified forward channel optical signal $\lambda_f$ is then passed through the optical ring resonator 812, which operates to remove or filter remnants of the forward optical pump signal $\lambda_{fp}$ and other unwanted optical components from the amplified forward optical signal $\lambda_f$. The tap isolator 818 couples off a relatively small portion of the amplified forward optical signal $\lambda_f$ for the second detector 820, and outputs the remainder portion of the amplified forward channel optical signal $\lambda_f$. The second detector 820 generates an electrical signal based on the forward optical signal $\lambda_f$, and may digitize the electrical signal for processing by the microcontroller 830. The microcontroller 830 controls the forward channel optical pump 810, and in particular, the power level of the forward channel optical pump signal $\lambda_{fp}$ based on the electrical signals from the first and second detectors 804 and 820 in order to achieve a defined gain for the forward channel optical signal $\lambda_f$.

The amplification of the composite reverse channel signal $\lambda_{rc}$ or ($\lambda_{rc1}$ and $\lambda_{rc2}$) operate in a similar manner. The tap isolator 818 receives the composite reverse channel optical signal $\lambda_{rc}$ or ($\lambda_{rc1}$ and $\lambda_{rc2}$) from the WDM 725, couples off a relatively small portion of the reverse optical signal $\lambda_{rc}$ or ($\lambda_{rc1}$ and $\lambda_{rc2}$) for the second detector 820, and forwards the remainder to the reverse channel gain medium 814. The second detector 820 generates an electrical signal based on the reverse channel optical signal $\lambda_{rc}$ or ($\lambda_{rc1}$ and $\lambda_{rc2}$), and may digitize the electrical signal for processing by the microcontroller 830. The gain medium 814 combines the reverse channel optical signal $\lambda_{rc}$ or ($\lambda_{rc1}$ and $\lambda_{rc2}$) with a reverse channel pump optical signal $\lambda_{rp}$ generated by the reverse channel optical pump 816 to amplify the reverse optical signal $\lambda_{rc}$ or ($\lambda_{rc1}$ and $\lambda_{rc2}$). As an example, the gain medium 814 may comprise an erbium-doped fiber. Other types of gain mediums may be used.

The amplified reverse channel optical signal $\lambda_{rc}$ or ($\lambda_{rc1}$ and $\lambda_{rc2}$) is then passed through the optical ring resonator 812, which operates to remove or filter remnants of the reverse channel optical pump signal $\lambda_{rp}$ and other unwanted optical components from the amplified reverse channel optical signal $\lambda_{rc}$ or ($\lambda_{rc1}$ and $\lambda_{rc2}$). The tap 802 couples off a relatively small portion of the amplified reverse channel optical signal $\lambda_{rc}$ or ($\lambda_{rc1}$ and $\lambda_{rc2}$) for the first detector 804, and provides the remainder portion of the amplified reverse channel optical signal $\lambda_{rc}$ or ($\lambda_{rc1}$ and $\lambda_{rc2}$) to the optical communication medium 620 for transmission to the head-end 610. The first detector 804 generates an electrical signal based on the reverse channel optical signal $\lambda_{rc}$ or ($\lambda_{rc1}$ and $\lambda_{rc2}$), and may digitize the electrical signal for processing by the microcontroller 830. The microcontroller 830 controls the reverse channel optical pump 816, and in particular, the power level of the reverse channel optical pump signal $\lambda_{rp}$ based on the electrical signals from the first and second detectors 804 and 820 in order to achieve a defined gain for the reverse channel optical signal $\lambda_{rc}$ or ($\lambda_{rc1}$ and $\lambda_{rc2}$).

It shall be understood that the forward pump 810 may be calibrated or adjusted by the microcontroller 830 when the forward channel optical signal $\lambda_f$ is present and the composite reverse channel optical signal $\lambda_{rc}$ or ($\lambda_{rc1}$ and $\lambda_{rc2}$) is not present. Similarly, it shall be understood that the reverse pump 816 may be calibrated or adjusted by the microcontroller 830 when the composite reverse channel optical signal $\lambda_{rc}$ or ($\lambda_{rc1}$ and $\lambda_{rc2}$) is present and the forward channel optical signal $\lambda_f$ is not present. In this way, the microcontroller 830 is not adjusting the forward pump 810 based on the composite reverse channel optical signal $\lambda_{rc}$ or ($\lambda_{rc1}$ and $\lambda_{rc2}$), and not adjusting the reverse pump 816 based on the forward channel optical signal $\lambda_f$.

Figure 9A:
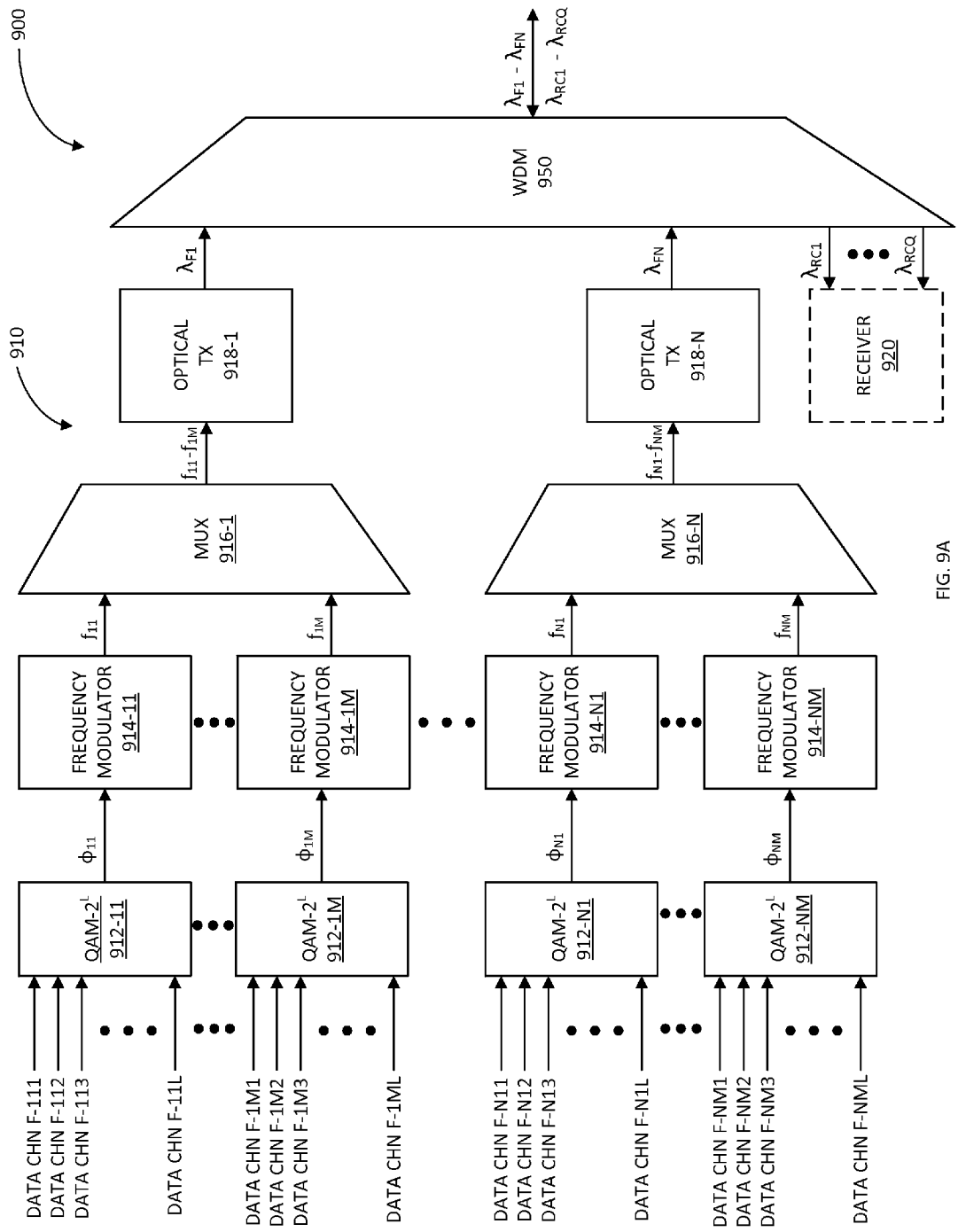
FIG. 9A illustrates a block diagram of an exemplary transceiver with details on a transmitter portion thereof in accordance with another aspect of the disclosure.

FIG. 9A illustrates a block diagram of an exemplary transceiver 900 with details on a transmitter portion thereof in accordance with another aspect of the disclosure. The transceiver 900 may be employed in any of the exemplary head-ends described herein. As previously discussed, the content data sent from the head-end to subscriber units may use one or more wavelengths $\lambda_f$. In the instant example, transceiver 900 uses three levels of channel modulation to send content data via a plurality of separate channels to subscribers. The first level of channel modulation is in the quadrature amplitude modulation (QAM) domain. The second level of channel modulation is in the frequency division multiplexing (FDM) domain. And, the third level of channel modulation is in the wavelength division multiplexing (WDM) domain.

More specifically, the transceiver 900 comprises a transmitter 910, a receiver 920, and a wavelength division multiplexer (WDM) 950. In FIG. 9A, the specifics of the transmitter 910 of the transceiver 900 are illustrated and described in detail immediately below. However, in FIG. 9A, the receiver 920 is represented as a dashed block, and the specifics of the receiver 920 are shown in and described with reference to FIG. 9B. The transmitter 910 comprises a plurality of QAM modulators 912-11 to 912-NM, a plurality of frequency modulators 914-11 to 914-NM, a plurality of multiplexers 916-1 to 916-N, and a plurality of optical transmitters (or modulators) 918-1 to 918-N. The integer N represents the number of distinct wavelength forward channels used by the transceiver 900, and the integer M represents the number of forward frequency channels per each distinct wavelength.

Data pertaining to separate forward channels are applied to the QAM modulators. For instance, data pertaining to forward channels F-111 to F-11L are applied to QAM modulator 912-11; data pertaining to forward channels F-1M1 to F-1ML are applied to QAM modulator 912-1M; data pertaining to forward channels F-N11 to F-N1L are applied to QAM modulator 912-N1; and data pertaining to forward channels F-NM1 to F-NML are applied to QAM modulator 912-NM. Thus, the integer L represents the number of data channels per QAM modulator. Using this configuration, the variables L, M, and N may be configured to a desired number of data channels, which may be given by L*M*N.

Given the L data channels per each QAM modulator, the output signal of each QAM modulator has $2^L$ number of constellation points. As an example, the number of data channels applied to each QAM modulator could be six (6), which translates to each QAM generating an output signal having 64 constellation points (e.g., $2^6$). As another example, the number of data channels applied to each QAM could be eight (8), which translates to each QAM generating an output signal having 256 constellation points (e.g., $2^8$). The outputs of the QAM modulators are the corresponding data channels in the quadrature amplitude/phase modulation domain. For example, QAM modulator 912-11 generates QAM channel signal $\phi_{11}$; QAM modulator 912-1M generates QAM channel signal $\phi_{1M}$; QAM modulator 912-N1 generates QAM channel signal $\phi_{N1}$; and QAM modulator 912-NM generates QAM channel signal $\phi_{NM}$.

The quadrature amplitude/phase modulations channel signals from the output of the QAM modulators are applied to frequency modulators, respectively. For instance, QAM channel signal $\phi_{11}$ generated by QAM modulator 912-11 is applied to frequency modulator 914-11; QAM channel signal $\phi_{1M}$ generated by QAM modulator 912-1M is applied frequency modulator 914-1M; QAM channel signal $\phi_{N1}$ generated by QAM modulator 912-N1 is applied to frequency modulator 914-N1; and QAM channel signal $\phi_{NM}$ generated by QAM modulator 912-NM is applied to frequency modulator 914-NM.

The frequency modulators modulate the quadrature amplitude/phase modulated signals onto respective distinct frequency carriers. For instance, frequency modulator 914-11 modulates QAM signal $\phi_{11}$ onto frequency carrier $f_{11}$; frequency modulator 914-1M modulates QAM signal $\phi_{1M}$ onto frequency carrier $f_{1M}$; frequency modulator 914-N1 modulates QAM signal $\phi_{N1}$ onto frequency carrier $f_{N1}$; and frequency modulator 914-NM modulates QAM signal $\phi_{NM}$ onto frequency carrier $f_{NM}$. The frequency modulated carriers are applied to the multiplexers, respectively. For instance, the frequency modulated carriers are $f_{11}$-$f_{1M}$ applied to multiplexer 916-1, and the frequency modulated carriers $f_{N1}$-$f_{NM}$ are applied to multiplexer 916-N.

The multiplexers combine or multiplex the corresponding frequency modulated carriers to form frequency division multiplex (FDM) signals. For instance, the multiplexer 916-1 multiplexes the frequency modulated carriers $f_{11}$ to $f_{1M}$ to form FDM signal $f_{11}$-$f_{1M}$. Similarly, the multiplexer 916-N multiplexes the frequency modulated carriers $f_{N1}$ to $f_{NM}$ to form FDM signal $f_{N1}$-$f_{NM}$. The FDM signals from the outputs of the multiplexers 916-1 to 916-N are applied to the optical transmitters 918-1 to 918-N, respectively.

The optical transmitters modulate the FDM signals from the multiplexers onto optical carriers of distinct wavelengths, respectively. For instance, optical transmitter 918-1 modulates the FDM signal $f_{11}$-$f_{1M}$ onto optical carrier $\lambda_{F1}$, and optical transmitter 918-N modulates the FDM signal $f_{N1}$-$f_{NM}$ onto optical carrier $\lambda_{FN}$. The modulated optical carriers $\lambda_{F1}$ to $\lambda_{FN}$ are applied to the wavelength division multiplexer (WDM) 950 which multiplexes the optical carriers onto an optical communication medium (e.g., an optical fiber) to form a WDM forward channel signal $\lambda_{F1}$-$\lambda_{FN}$ for transmission to subscriber units. Thus, as exemplified, the transceiver 900 is capable of very broad bandwidth applications, allowing the transmissions of many data channels using three levels of channel modulation in the: (1) quadrature amplitude/phase domain, (2) frequency division domain, and (3) wavelength division domain.

Figure 9B:
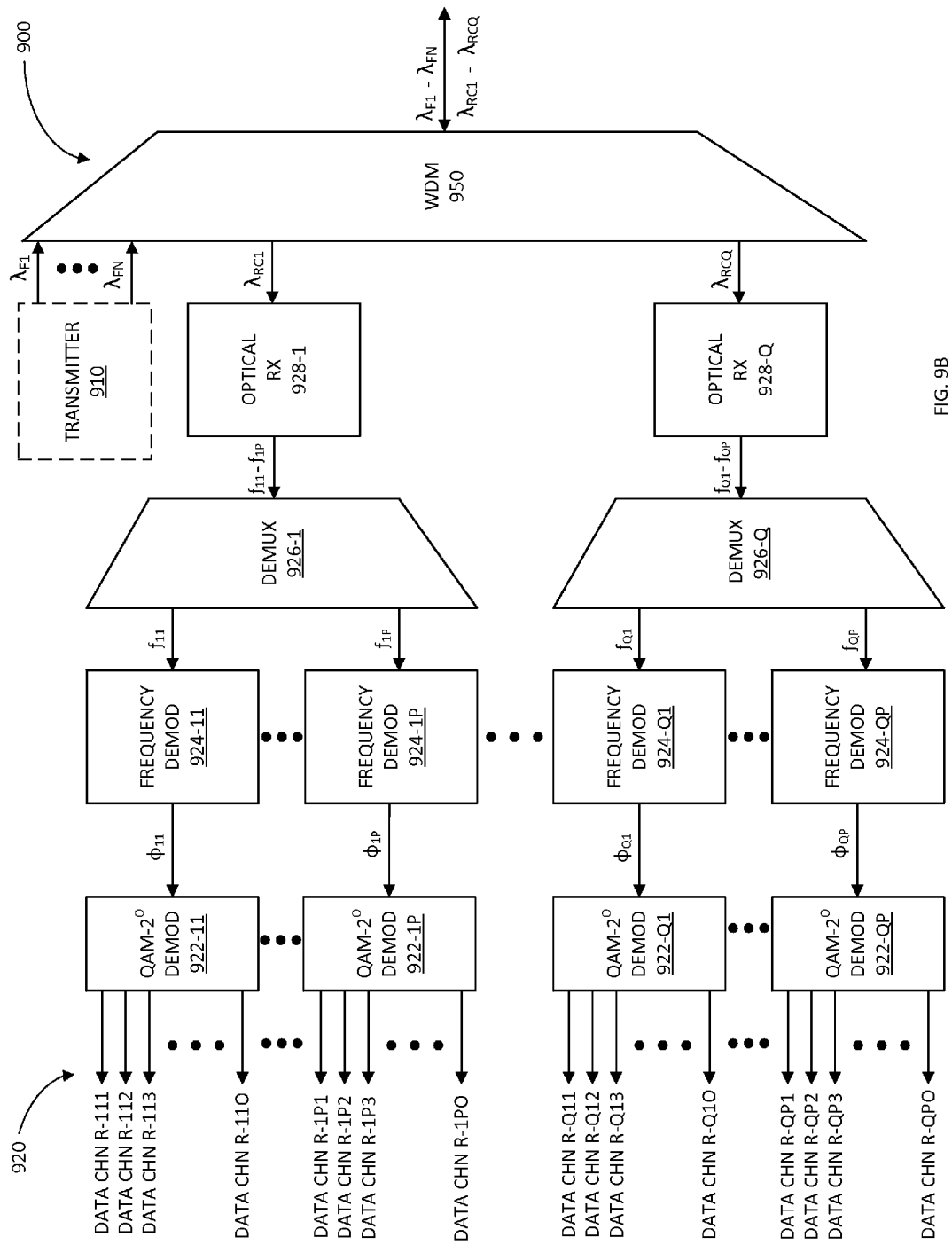
FIG. 9B illustrates a block diagram of the exemplary transceiver with details on a receiver portion thereof in accordance with another aspect of the disclosure.

FIG. 9B illustrates a block diagram of the exemplary transceiver 900 with details on a receiver portion thereof in accordance with another aspect of the disclosure. As previously discussed, FIG. 9B illustrates the details of the receiver 920 of the transceiver 900, and represents the transmitter 910, previously discussed in detail, as a dashed block as shown. Similar to the transmitter 910, the receiver 920 uses three levels of channel demodulation to produce data pertaining to a plurality of reverse channels. The three levels of channel demodulation include: (1) demodulation in the wavelength division domain, (2) demodulation in the frequency division domain, and (3) demodulation in the quadrature amplitude/phase domain.

More specifically, the receiver 920 comprises a plurality of optical receivers (or demodulators) 928-1 to 928-Q, a plurality of de-multiplexers 926-1 to 926-Q, a plurality of frequency demodulators 924-11 to 924-QP, and a plurality of QAM demodulators 922-11 to 922-QP. The integer Q represents the number of distinct reverse wavelength channels used by the transceiver, and the integer P represents the number of reverse frequency channels per each distinct wavelength.

In addition to transmitting the WDM forward channel signals $\lambda_{F1}$ to $\lambda_{FN}$ via the optical transmission medium, the WDM 950 also receives the WDM composite reverse channel signals $\lambda_{RC1}$ to $\lambda_{RCQ}$ from the optical transmission medium. The WDM 950 separates or de-multiplexes the signals $\lambda_{RC1}$ to $\lambda_{RCQ}$ and applies them to optical receivers 928-1 to 928-Q, respectively. The optical receivers demodulates the WDM composite reverse channel signals to generate FDM composite reverse channel signals, respectively. For instance, optical receiver 928-1 demodulates WDM composite reverse channel signal $\lambda_{RC1}$ to generate FDM composite reverse channel signal $f_{11}$-$f_{1P}$. Similarly, optical receiver 928-Q demodulates WDM composite reverse channel signal $\lambda_{RCQ}$ to generate FDM reverse channel signal $f_{Q1}$-$f_{QP}$. The optical receivers 928-1 to 928-Q apply the FDM composite reverse channel signals $f_{11}$-$f_{1P}$ to $f_{Q1}$-$f_{QP}$ to de-multiplexers 926-1 to 926-Q, respectively.

The de-multiplexers separate or de-multiplexes the FDM composite reverse signals into their respective frequency modulated carriers. For instance, the de-multiplexer 926-1 separates the FDM composite reverse channel signal $f_{11}$-$f_{1P}$ into frequency modulated carriers $f_{11}$ to $f_{1P}$. Similarly, the de-multiplexer 926-Q separates the FDM composite reverse channel signal $f_{11}$-$f_{1P}$ into frequency modulated carriers $f_{Q1}$ to $f_{QP}$. The de-multiplexers apply the frequency modulated carriers to respective frequency demodulators. For instance, de-multiplexer 926-1 applies frequency modulated carriers $f_{11}$ to $f_{1P}$ to frequency demodulators 924-11 to 924-1P, respectively. Similarly, de-multiplexer 926-Q applies frequency modulated carriers $f_{Q1}$ to $f_{QP}$ to frequency demodulators 924-Q1 to 924-QP, respectively.

The frequency demodulators demodulate the respective frequency modulated carriers to generate the quadrature amplitude/phase modulated composite reverse channel signals, respectively. For instance, frequency-demodulator 924-11 demodulates the frequency modulated carrier $f_{11}$ to generate QAM signal $\phi_{11}$; frequency-demodulator 924-1P demodulates the frequency modulated carrier $f_{1P}$ to generate QAM signal $\phi_{1P}$; frequency-demodulator 924-Q1 demodulates the frequency modulated carrier $f_{Q1}$ to generate QAM signal $\phi_{Q1}$; and frequency-demodulator 924-QP demodulates the frequency modulated carrier $f_{QP}$ to generate QAM signal $\phi_{QP}$.

The frequency demodulators apply the quadrature amplitude/phase modulated signals to respective QAM demodulators, respectively. For instance, frequency demodulator 922-11 applies QAM signal $\phi_{11}$ to QAM demodulator 922-11; frequency demodulator 922-1P applies QAM signal $\phi_{1P}$ to QAM demodulator 922-1P; frequency demodulator 922-Q1 applies QAM signal $\phi_{Q1}$ to QAM demodulator 922-Q1; and frequency demodulator 922-QP applies QAM signal $\phi_{QP}$ to QAM demodulator 922-QP.

The QAM demodulators demodulate the quadrature amplitude/phase modulated signals to generate the reverse channel data. For instance, the QAM demodulator 922-11 demodulates QAM signal $\phi_{11}$ to produce data pertaining to reverse channels R-111 to R-11O; QAM demodulator 922-1P demodulates QAM signal $\phi_{1P}$ to produce data pertaining to reverse channels R-1P1 to R-1PO; QAM demodulator 922-Q1 demodulates QAM signal $\phi_{Q1}$ to produce data pertaining to reverse channels R-Q11 to R-Q1O; and QAM demodulator 922-QP demodulates QAM signal $\phi_{QP}$ to produce data pertaining to reverse channels R-QP1 to R-QPO.

Thus, as exemplified, the transceiver 900 is capable of very broad bandwidth applications, allowing the reception of many data channels using three levels of channel demodulation: (1) wavelength division demodulation, (2) frequency division demodulation, and (3) quadrature amplitude/phase demodulation.

Figure 10A:
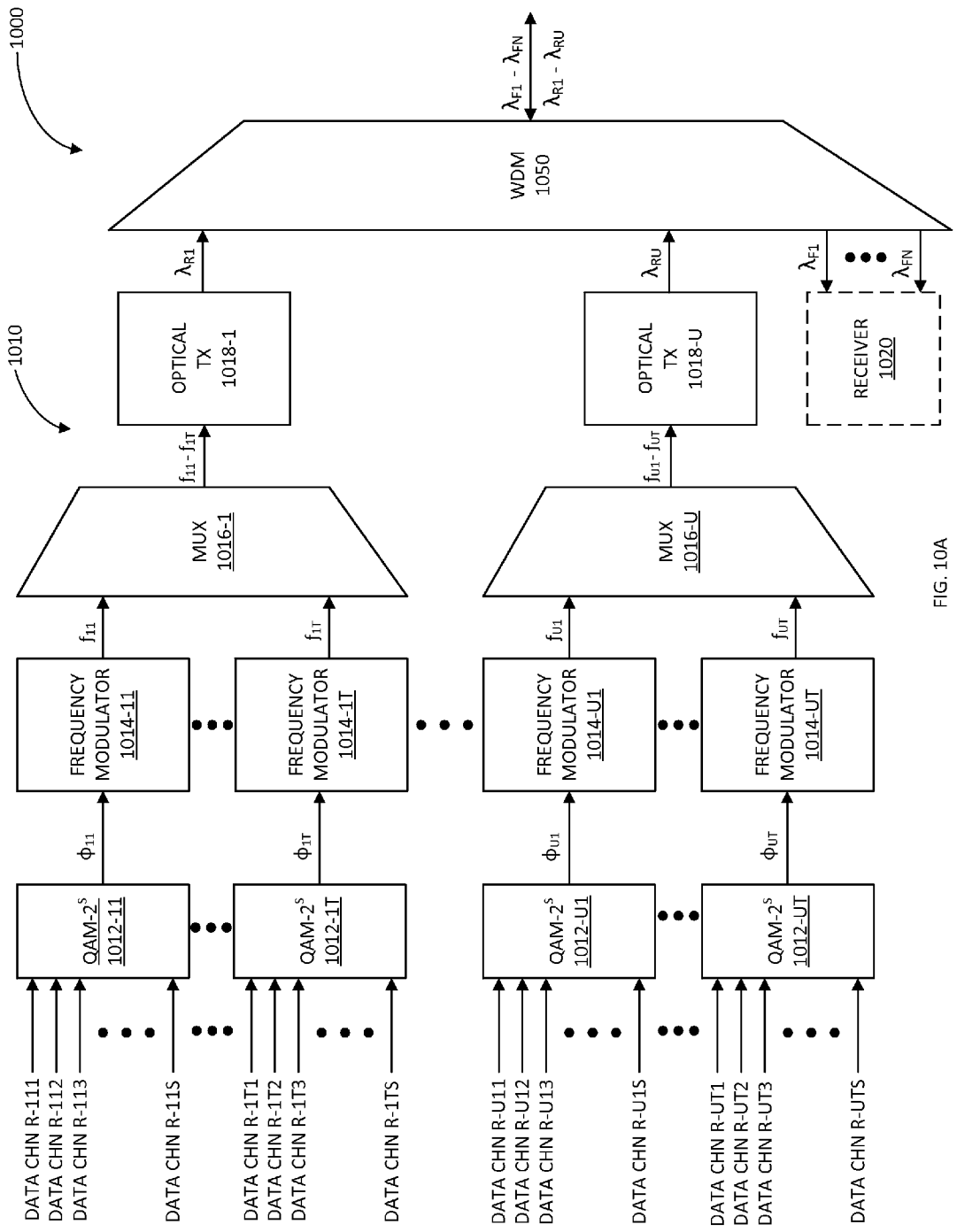
FIG. 10A illustrates a block diagram of another exemplary transceiver with details on a transmitter portion thereof in accordance with another aspect of the disclosure.

FIG. 10A illustrates a block diagram of another exemplary transceiver 1000 with details on a transmitter portion thereof in accordance with another aspect of the disclosure. The transceiver 1000 may be employed in the subscribers' side of an optical communication system. The transceiver 1000 uses the same principles in transmitting reverse channel data to the head-end, as the head-end uses to transmit forward channel data to subscribers. That is, the transceiver 1000 uses three levels of channel modulation in the quadrature amplitude/phase domain, frequency division domain, and wavelength division domain to transmit reverse channel data to the head-end. Since transceiver 900 was discussed in detail above, and transceiver 1000 applies the same or similar principles, the following discussion on transceiver 1000 will be briefer.

Figure 10B:
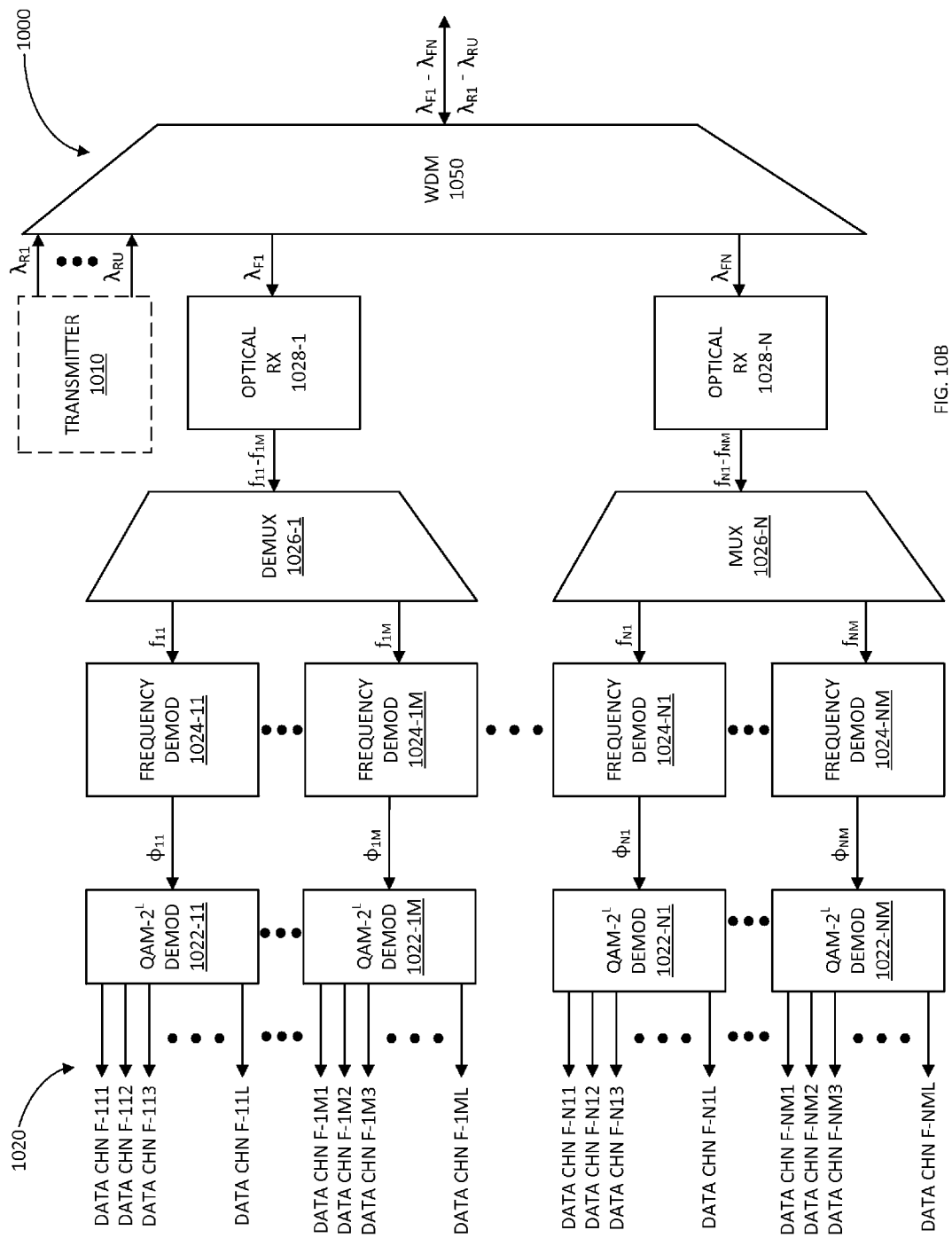
FIG. 10B illustrates a block diagram of the exemplary transceiver with details on a receiver portion thereof in accordance with another aspect of the disclosure.

In FIG. 10A, the details of the transmitter 1010 are shown, and the receiver 1010 is represented as a dashed block. The details of receiver are shown in FIG. 10B. The transmitter 1010 comprises a plurality of QAM modulators 1012-1 to 1012-UT, a plurality of frequency modulators 1014-11 to 1024-UT, a plurality of multiplexers 1016-1 to 1016-U, and a plurality of optical transmitters 1018-1 to 1018-U.

Data pertaining to reverse channels R-111-R-111S to R-1T1-R-1TS to R-U11-R-U1S to R-UT1-R-UTS are applied to QAM modulators 1012-11 to 1012-1T to 1012-U1 to 1012-UT to generate QAM signals $\phi_{11}$ to $\phi_{1T}$ to $\phi_{U1}$ to $\phi_{UT}$, respectively. The frequency modulators 1014-11 to 1014-1T to 1014-U1 to 1014-UT frequency modulate QAM signals $\phi_{11}$ to $\phi_{1T}$ to $\phi_{U1}$ to $\phi_{UT}$ to generate frequency modulated carriers $f_{11}$ to $f_{1T}$ to $f_{U1}$ to $f_{1UT}$, respectively. The multiplexers 1016-1 to 1016-U combines or multiplexes the frequency modulated carriers $f_{11}$ to $f_{1T}$ to $f_{U1}$ to $f_{1UT}$ to generate FDM signals $f_{11}$-$f_{1T}$ to $f_{U1}$-$f_{1UT}$, respectively. The optical transmitters 1018-1 to 1018-U modulate the FDM signals $f_{11}$-$f_{1T}$ to $f_{U1}$-$f_{1UT}$ onto optical carriers to generate modulated optical carriers $\lambda_{R1}$ to $\lambda_{RU}$ respectively. The WDM 1050 combines or multiplexes the modulated optical carriers $\lambda_{R1}$ to $\lambda_{RU}$ onto an optical communication medium (e.g., an optical fiber) to generate WDM signals $\lambda_{R1}$-$\lambda_{RU}$ for transmission to the head-end.

FIG. 10B illustrates a block diagram of the exemplary transceiver 1000 with details on a receiver portion thereof in accordance with another aspect of the disclosure. The transceiver 1000 uses the same principles in receiving forward channel data from the head-end, as the head-end uses to receive reverse channel data from subscribers. That is, the transceiver 1000 uses three levels of channel demodulation in the wavelength division domain, frequency division domain, and quadrature amplitude/phase domain to receive forward channel data from the head-end. Since transceiver 900 was discussed in detail above, and transceiver 1000 applies the same or similar principles, the following discussion on transceiver 1000 will be briefer.

In FIG. 10B, the details of the receiver 1020 are shown, and the transmitter 1010, previously discussed in detail, is represented as a dashed block. In particular, the receiver 1020 comprises a plurality of optical receivers 1028-1 to 1028-N, a plurality of de-multiplexers 1026-1 to 1026-N, a plurality of frequency demodulators 1024-11 to 1024-NM, and a plurality of QAM demodulators 1022-11 to 1022-NM.

The WDM 1050 receives the WDM forward channel signals $\lambda_{F1}$-$\lambda_{FN}$ and separates or de-multiplexes into separate modulated optical carriers $\lambda_{F1}$ to $\lambda_{FN}$. The optical receivers 1028-1 to 1028-N demodulate the optical carriers $\lambda_{F1}$ to $\lambda_{FN}$ to generate FDM signals $f_{11}$-$f_{1M}$ to $f_{N1}$-$f_{NM}$, respectively. The de-multiplexers 1026-1 to 1026-N separates or de-multiplexes the FDM signals into separate modulated frequency carriers $f_{11}$ to $f_{1M}$ to $f_{N1}$ to $f_{NM}$, respectively. The frequency demodulators 1024-1 to 1024-NM demodulates the modulated frequency carriers $f_{11}$ to $f_{1M}$ to $f_{N1}$ to $f_{NM}$ to generate QAM signals $\phi_{11}$ to $\phi_{1M}$ to $\phi_{N1}$ to $\phi_{NM}$, respectively. The QAM demodulators 1022-11 to 1022-1M to 1022-N1 to 1022-NM perform quadrature demodulation of the QAM $\phi_{11}$ to $\phi_{1M}$ to $\phi_{N1}$ to $\phi_{NM}$ to generate the data pertaining to forward channels F-111-F-11L to F-1M1-F-1ML to F-N11-FN1L, and to F-NM1-F-NML, respectively.

A difference between the transceiver 900 of the head-end and the transceiver 1000 is that generally the amount of forward channel data is substantially greater than the amount of reverse channel data. Accordingly, the head-end transceiver 900 may use QAM modulators of greater constellation points, such as QAM-64 and QAM-256, whereas the subscriber-side transceiver 1000 may use QAM modulators of lesser constellation points, such as QAM-16. Along this line, the head-end transceiver 900 may use QAM demodulators of lesser constellation points, such as QAM-16, to receive the reverse channel data, whereas the subscriber unit transceiver 1000 may use QAM demodulators of greater constellation points, QAM-64 and QAM-256, to receive the forward channel data.

Another difference between the transceiver 900 of the head-end and the subscriber-side transceiver 1000 is that the head-end transceiver 900 does not generally compete with another head-end in sending forward channel data to subscribers units, while subscriber units generally compete among each other in sending reverse channel data to the head-end. Accordingly, a channel assigning process may be implemented in each subscriber unit in order to prevent channel collision among the subscribers. For instance, a subscriber unit may have a dedicated or dynamically-assignable reverse channel including a distinct QAM constellation, a distinct frequency carrier and a distinct wavelength carrier. As another example, a particular wavelength channel may be assigned to subscriber units pertaining to a relatively wide geographical area (e.g., a city), a frequency channel pertaining to that particular wavelength channel may be assigned to subscriber units in a smaller geographical area (e.g., a particular neighborhood or section of the city), and the various phase channels pertaining to that particular frequency channel may be assigned to the individual subscriber units, respectively. However, it shall be understood that other arrangements pursuant to the teachings herein are possible.

Given this example of the subscriber unit transceiver, the following describes an example of how a return transmitter module (RTM) of a signal distribution hub may process the reverse channel data.

Figure 11:
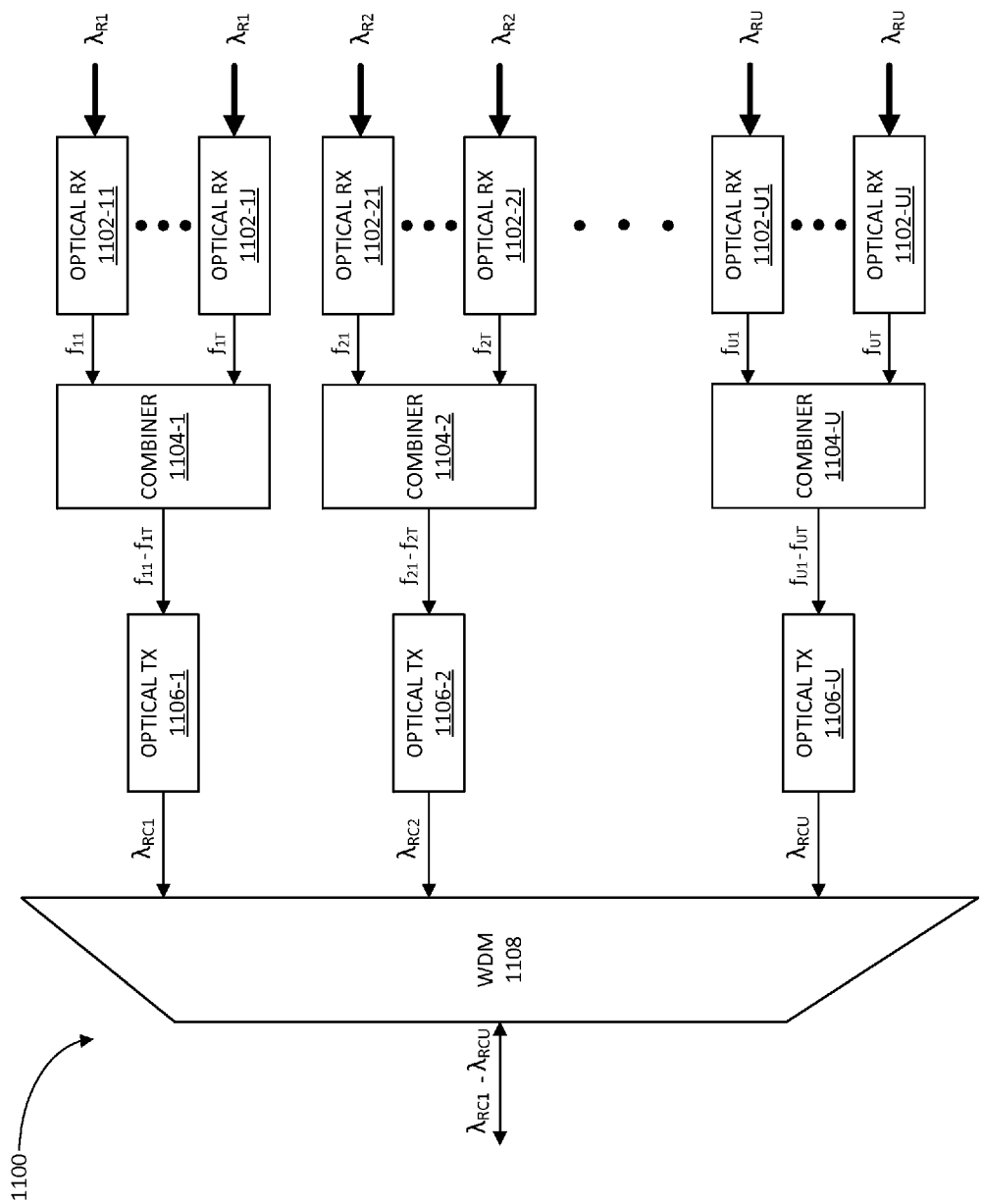
FIG. 11 illustrates a block diagram of another exemplary return transmitter module (RTM) in accordance with another aspect of the disclosure.

FIG. 11 illustrates a block diagram of another exemplary return transmitter module (RTM) 1100 in accordance with another aspect of the disclosure. In this example, there are J optical transmission lines coupling respective taps to a signal distribution hub, as previously discussed herein. Also, in accordance with this example, each optical transmission line carries U wavelength channels. The RTM 1100 comprises distinct sets of optical receivers 1102-11-1102-1J to 1102-U1-1102-UJ, a plurality of combiners 1104-1 to 1104-U, a plurality of optical transmitters 1106-1 to 1106-U, and a wavelength division multiplexer (WDM) 1108.

Each distinct set of optical receivers receive the same wavelength channel signal from the plurality of optical transmission lines coupling taps to the signal distribution hub by way of an optical distribution assembly (ODA), respectively. For instance, optical receivers 1102-11 to 1102-1J receive the same wavelength channel signals $\lambda_{R1}$ from the J optical transmission mediums by way of the ODA; optical receivers 1102-21 to 1102-2J receive the same wavelength channel signals $\lambda_{R2}$ from the J optical transmission mediums by way of the ODA; and optical receivers 1102-U1 to 1102-UJ receive the same wavelength channel signals $\lambda_{RU}$ from the J optical transmission mediums by way of the ODA.

Each wavelength from the separate optical transmission mediums may have been frequency modulated with distinct carrier frequency. Accordingly, the optical receivers demodulate the received optical signal to generate distinct modulated frequency carriers per each wavelength. For instance, optical receivers 1102-11 to 1102-1J demodulate the same wavelength channel signals $\lambda_{R1}$ from the separate optical transmission mediums to generate distinct modulated frequency carriers $f_{11}$ to $f_{1T}$, respectively; optical receivers 1102-21 to 1102-2J demodulate the same wavelength channel signals $\lambda_{R2}$ from the separate optical transmission mediums to generate distinct modulated frequency carriers $f_{21}$ to $f_{2T}$, respectively; and optical receivers 1102-U1 to 1102-UJ demodulate the same wavelength channel signals $\lambda_{RU}$ from the separate optical transmission mediums to generate distinct modulated frequency carriers $f_{U1}$ to $f_{UT}$, respectively.

The combiners or multiplexers 1104-1 to 1104-U combine the distinct modulated frequency carriers $f_{11}$ to $f_{1T}$ to $f_{U1}$ to $f_{UT}$ to generate FDM signals $f_{11}$-$f_{1T}$ to $f_{U1}$-$f_{UT}$, respectively. The optical transmitters 1106-1 to 1106-U modulate the FDM signals $f_{11}$-$f_{1T}$ to $f_{U1}$-$f_{UT}$ onto distinct optical carriers to generate composite modulated optical carriers $\lambda_{RC1}$ to $\lambda_{RCN}$, respectively. The WDM 1108 combines or multiplexes the modulated optical carriers $\lambda_{RC1}$ to $\lambda_{RCN}$ onto an optical communication medium to generate WDM signal $\lambda_{RC1}$-$\lambda_{RCN}$ for transmission to the head-end.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. An optical signal distribution hub, comprising:
   an amplifier configured to amplify a forward channel optical signal;
   an optical distribution assembly configured to:
      generate a plurality of forward channel optical signals from the amplified forward channel optical signal;
      transmit the plurality of forward channel optical signals by way of a plurality of optical communication mediums, respectively; and
      receive a plurality of reverse channel optical signals by way of the plurality of optical communication mediums, respectively; and
   a return transmitter module configured to generate one or more composite reverse channel optical signals based on the plurality of reverse channel optical signals, wherein the return transmitter module comprises:
      a plurality of optical receivers configured to generate a plurality of electrical signals based on the plurality of reverse channel optical signals, respectively;
      a first combiner configured to generate a first composite electrical signal based on a first subset of the plurality of electrical signals;
      a second combiner configured to generate a second composite electrical signal based on a second subset of the plurality of electrical signals, wherein the first subset is different than the second subset;
      a first optical transmitter configured to generate one of the composite reverse channel optical signals based on the first composite electrical signal; and
      a second optical transmitter configured to generate another of the composite reverse channel optical signals based on the second composite electrical signal.

2. The optical signal distribution hub of claim 1, wherein the amplifier comprises an optical amplifier.

3. The optical signal distribution hub of claim 2, wherein the optical amplifier comprises an erbium doped fiber amplifier.

4. The optical signal distribution hub of claim 2, wherein the optical amplifier comprises:
   an input tap configured to generate first and second portions of the forward channel optical signal;
   an input detector configured to generate a first electrical signal based on the first portion of the forward channel optical signal;
   an optical pump configured to generate a pump signal;
   a gain medium configured to amplify the second portion of the forward channel optical signal using the pump signal;
   an output tap configured to generate first and second portions of the amplified forward channel optical signal;
   an output detector configured to generate a second electrical signal based on the first portion of the amplified forward channel optical signal; and
   a controller configured to control the optical pump based on the first and second electrical signals.

5. The optical signal distribution hub of claim 4, wherein the optical amplifier further comprises:
   an isolator situated between the input tap and the gain medium; and
   an optical ring resonator situated between the gain medium and the output tap.

6. The optical signal distribution hub of claim 1, wherein the amplifier comprises a bi-directional optical amplifier including a first port and a second port, wherein the bi-directional optical amplifier is configured to receive the forward channel optical signal at the first port and generate the amplified forward channel optical signal at the second port, and wherein the bi-directional optical amplifier is further configured to receive the one or more composite reverse channel optical signals at the second port and generate an amplified one or more composite reverse channel optical signals at the first port.

7. The optical signal distribution hub of claim 6, wherein the bi-directional optical amplifier is coupled to another optical communication medium, wherein the bi-directional optical amplifier is configured to receive the forward channel optical signal by way of the another optical communication medium, and wherein the bi-directional optical amplifier is configured to transmit the amplified one or more composite reverse channel optical signals by way of the another optical communication medium.

8. The optical signal distribution hub of claim 6, wherein the bi-directional optical amplifier comprises:
 a forward channel optical pump configured to generate a forward channel pump signal;
 a reverse channel optical pump configured to generate a reverse channel pump signal;
 a forward channel gain medium configured to amplify the forward channel optical signal using the forward channel pump signal; and
 a reverse channel gain medium configured to amplify the one or more reverse channel optical signals using the reverse channel pump signal.

9. An optical signal distribution hub, comprising:
 an amplifier configured to amplify a forward channel optical signal;
 an optical distribution assembly configured to:
  generate a plurality of forward channel optical signals from the amplified forward channel optical signal;
  transmit the plurality of forward channel optical signals by way of a plurality of optical communication mediums, respectively; and
  receive a plurality of reverse channel optical signals by way of the plurality of optical communication mediums, respectively; and
 a return transmitter module configured to generate one or more composite reverse channel optical signals based on the plurality of reverse channel optical signals;
 wherein the amplifier comprises a bi-directional optical amplifier including a first port and a second port, wherein the bi-directional optical amplifier is configured to receive the forward channel optical signal at the first port and generate the amplified forward channel optical signal at the second port, and wherein the bi-directional optical amplifier is further configured to receive the one or more composite reverse channel optical signals at the second port and generate an amplified one or more composite reverse channel optical signals at the first port;
 wherein the bi-directional optical amplifier comprises:
  a forward channel optical pump configured to generate a forward channel pump signal;
  a reverse channel optical pump configured to generate a reverse channel pump signal;
  a forward channel gain medium configured to amplify the forward channel optical signal using the forward channel pump signal; and
  a reverse channel gain medium configured to amplify the one or more reverse channel optical signals using the reverse channel pump signal; and
 wherein the bi-directional optical amplifier further comprises:
  a first tap configured to:
   generate first and second portions of the forward channel optical signal; and
   generate first and second portions of the amplified one or more composite reverse channel optical signals;
  a first detector configured to:
   generate a first electrical signal based on the first portion of the forward channel optical signal; and
   generate a second electrical signal based on the first portion of the amplified one or more composite reverse channel optical signals;
  a second tap configured to:
   generate first and second portions of the amplified forward channel optical signal; and
   generate first and second portions of the one or more composite reverse channel optical signals;
  a second detector configured to:
   generate a third electrical signal based on the first portion of the amplified forward channel optical signal; and
   generate a fourth electrical signal based on the first portion of the one or more composite reverse channel optical signals; and
  a controller configured to:
   control the forward channel optical pump based on the first and third electrical signals; and
   control the forward channel optical pump based on the second and fourth electrical signals.

10. The optical signal distribution hub of claim 1, wherein the optical distribution assembly comprises:
 a splitter configured to split the amplified forward channel optical signal into the plurality of forward channel optical signals; and
 a plurality of wavelength-division multiplexers configured to:
  multiplex the plurality of forward channel optical signals onto the plurality of optical communication mediums, respectively; and
  de-multiplex the plurality of reverse channel optical signals from the plurality of optical communication mediums, respectively.

11. The optical signal distribution hub of claim 1, wherein the return transmitter module further comprises a wavelength-division multiplexer configured to multiplex the one and the another of the composite reverse channels optical signals onto anther optical communication medium for transmission thereof.

12. The optical signal distribution hub of claim 1, wherein the forward channel optical signal comprises one or more wavelength channels, wherein each one or more wavelength channel comprises one or more frequency channels, and wherein each one or more frequency channel comprises one or more QAM channels.

13. The optical signal distribution hub of claim 1, wherein at least one of the reverse channel optical signals comprises one or more wavelength channels, wherein each one or more wavelength channel comprises one or more frequency channels, and wherein each one or more frequency channel comprises one or more QAM channels.

14. A return transmitter module, comprising:
a plurality of optical receivers configured to generate a plurality of electrical signals based on a plurality of reverse channel optical signals, respectively;
a combiner configured to generate at least one composite electrical signal based on the plurality of electrical signals, wherein the combiner comprises:
a first sub-combiner configured to generate one of the at least one electrical signal based on a first subset of plurality of electrical signals; and
a second sub-combiner configured to generate another of the at least one composite electrical signal based on a second subset of the plurality of electrical signals, wherein the first subset is different than the second subset; and
an optical transmitter configured to generate at least one composite reverse channel optical signal based on the at least one composite electrical signal.

15. The return transmitter module of claim 14, wherein the optical transmitter comprises:
a first optical sub-transmitter configured to generate one of the at least one composite reverse channel optical signal based on the one of the at least one composite electrical signal; and
a second optical sub-transmitter configured to generate another of the at least one composite reverse channel optical signal based on the another of the at least one composite electrical signal.

16. The return transmitter module of claim 15, further comprising a wavelength-division multiplexer configured to multiplex the one and the another of the at least one composite reverse channel optical signals onto an optical communication medium for transmission thereof.

17. The return transmitter module of claim 14, wherein at least one of the reverse channel optical signals comprises one or more wavelength channels, wherein each one or more wavelength channel comprises one or more frequency channels, and wherein each one or more frequency channel comprises one or more QAM channels.

* * * * *